(12) United States Patent
Otoshi

(10) Patent No.: US 8,101,108 B2
(45) Date of Patent: Jan. 24, 2012

(54) CELLULOSE ACYLATE RESIN FILM AND METHOD FOR PRODUCING THE SAME

(75) Inventor: Masaaki Otoshi, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 605 days.

(21) Appl. No.: 11/514,230

(22) Filed: Sep. 1, 2006

(65) Prior Publication Data

US 2007/0054143 A1    Mar. 8, 2007

(30) Foreign Application Priority Data

Sep. 2, 2005   (JP) .................. 2005-255154

(51) Int. Cl.
*B32B 23/04*    (2006.01)
(52) U.S. Cl. .................. 264/211.23; 264/1.34
(58) Field of Classification Search ............ 264/211.23, 264/1.34
See application file for complete search history.

(56) References Cited

U.S. PATENT DOCUMENTS

| | | | |
|---|---|---|---|
| 3,860,220 A * | 1/1975 | Matsubayashi et al. | 366/86 |
| 3,972,854 A * | 8/1976 | Costolow | 524/236 |
| 4,863,653 A * | 9/1989 | Takubo et al. | 264/40.7 |
| 5,116,881 A * | 5/1992 | Park et al. | 521/143 |
| 5,180,751 A * | 1/1993 | Park et al. | 521/51 |
| 5,804,111 A * | 9/1998 | Kobayashi et al. | 264/40.5 |
| 6,552,145 B1* | 4/2003 | Okada et al. | 526/281 |
| 2003/0021915 A1* | 1/2003 | Rohatgi et al. | 428/15 |
| 2005/0046070 A1* | 3/2005 | Dong et al. | 264/141 |
| 2005/0150426 A1* | 7/2005 | Hashimoto et al. | 106/170.21 |
| 2007/0036916 A1* | 2/2007 | Fujisawa et al. | 428/1.3 |

FOREIGN PATENT DOCUMENTS

| | | | |
|---|---|---|---|
| JP | 2000-352620 | * | 12/2000 |
| JP | 2000-352620 A | | 12/2000 |
| JP | 2006-028345 | * | 2/2006 |

OTHER PUBLICATIONS

Eastman supplier interet page showing resin form options (PDF).*

* cited by examiner

*Primary Examiner* — Joseph Del Sole
*Assistant Examiner* — Kimberly A Stewart
(74) *Attorney, Agent, or Firm* — Sughrue Mion, PLLC

(57) ABSTRACT

The present invention provides a method for producing a cellulose acylate resin film, comprising the step of, melting a cellulose acylate resin in an extruder and extruding the molten cellulose acylate resin to a die, wherein the step of melting is carried out using a tandem extruder having a first-stage extruder and a second-stage extruder connected in tandem, in order to prevent discoloration and thickness non-uniformity make the film seriously defective for use as an optical film. Because the resin in the form of a powder or flakes is once pelletized in a pelletizing extruder, and then the pellets are melt-extruded in an extruder. This promotes discoloration of the resin, disadvantageously.

6 Claims, 5 Drawing Sheets

FIG.4

TABLE 1

| | RAW MATERIAL: CELLULOSE ACYLATE RESIN | | | | | | | EXTRUDER | | RESERVOIR | |
|---|---|---|---|---|---|---|---|---|---|---|---|
| | SUBSTITUTION DEGREE | | | | | $T_g$ (°C) | FORM | FIRST-STAGE | SECOND-STAGE | TANK | NITROGEN SUBSTITUTION |
| | ACETATE GROUP (X) | PROPIONATE GROUP (Y1) | BUTYLATE GROUP (Y2) | Y (SUM OF Y1–4) | X+Y | | | | | | |
| EXAMPLE 1 | 0.2 | 2.7 | – | 2.7 | 2.9 | 125 | POWDER | TWIN-SCREW | SINGLE-SCREW | PRESENT | PRESENT |
| EXAMPLE 2 | 0.2 | 2.7 | – | 2.7 | 2.9 | 125 | FLAKES | SINGLE-SCREW | SINGLE-SCREW | PRESENT | PRESENT |
| EXAMPLE 3 | 0.2 | 2.7 | – | 2.7 | 2.9 | 125 | POWDER | TWIN-SCREW | SINGLE-SCREW | NONE | – |
| EXAMPLE 4 | 0.2 | 2.7 | – | 2.7 | 2.9 | 125 | PELLETS | SINGLE-SCREW | SINGLE-SCREW | PRESENT | PRESENT |
| EXAMPLE 5 | 0.2 | 2.7 | – | 2.7 | 2.9 | 125 | POWDER | TWIN-SCREW | SINGLE-SCREW | PRESENT | NONE |
| COMPARATIVE EXAMPLE 1 | 0.2 | 2.7 | – | 2.7 | 2.9 | 125 | FLAKES | TWIN-SCREW | – | – | – |
| COMPARATIVE EXAMPLE 2 | 0.2 | 2.7 | – | 2.7 | 2.9 | 125 | POWDER | SINGLE-SCREW | – | – | – |

| | FLUCTUATION IN DISCHARGE PRESSURE (%) | THICKNESS | | YELLOWNESS YI VALUE |
|---|---|---|---|---|
| | | (μm) | FLUCTUATION (μm) | |
| EXAMPLE 1 | 0.9 | 100 | 1.8 | 5.6 |
| EXAMPLE 2 | 2.3 | 100 | 2.9 | 5.3 |
| EXAMPLE 3 | 2.2 | 100 | 2.8 | 6.2 |
| EXAMPLE 4 | 0.8 | 100 | 1.5 | 6.4 |
| EXAMPLE 5 | 0.9 | 100 | 1.9 | 9.8 |
| COMPARATIVE EXAMPLE 1 | 8.7 | 100 | 10.4 | 5.3 |
| COMPARATIVE EXAMPLE 2 | 9.2 | 100 | 12.3 | 5.7 |

FIG.5

TABLE 2

| | CELLULOSE ACYLATE | | | | | PLASTICIZER | | UNSTRETCHED FILM | | | LAYER CONFIGURATION OF POLARIZING PLATE | OTHER PROPERTIES | |
|---|---|---|---|---|---|---|---|---|---|---|---|---|---|
| | X SUBSTITUTION DEGREE OF ACETYL GROUP | Y SUBSTITUTION DEGREE OF GROUP OTHER THAN ACETYL GROUP | Y SUBSTITUTE OTHER THAN ACETYL GROUP | X+Y TOTAL SUBSTITUTION DEGREE | POLYMERIZATION DEGREE | TYPE | AMOUNT | THICKNESS (μm) | Re (nm) | Rth (nm) | | COLOR TONE CHANGE IN POLARIZING PLATE* | EVALUATION |
| EXAMPLE 1 | 0.11 | 2.81 | PROPIONYL | 2.92 | 190 | PLASTICIZER 4 | 6.0 | 110 | 3 | 20 | POLARIZING PLATE A | 1 | GOOD |
| EXAMPLE 2 | 0.20 | 2.60 | PROPIONYL | 2.80 | 200 | PLASTICIZER 4 | 8.0 | 80 | 0 | 8 | POLARIZING PLATE A | 0 | GOOD |
| EXAMPLE 3 | 0.25 | 2.53 | PROPIONYL | 2.78 | 210 | PLASTICIZER 4 | 10.0 | 90 | 1 | 16 | POLARIZING PLATE B | 0 | GOOD |
| EXAMPLE 4 | 0.40 | 2.30 | PROPIONYL | 2.70 | 170 | PLASTICIZER 3 | 6.0 | 110 | 5 | 30 | POLARIZING PLATE B | 1 | GOOD |
| EXAMPLE 5 | 0.70 | 1.90 | PROPIONYL | 2.60 | 185 | PLASTICIZER 3 | 9.0 | 95 | 8 | 42 | POLARIZING PLATE A | 2 | GOOD |
| EXAMPLE 6 | 1.10 | 1.40 | PROPIONYL | 2.50 | 195 | PLASTICIZER 3 | 12.0 | 125 | 8 | 58 | POLARIZING PLATE A | 2 | GOOD |
| EXAMPLE 7 | 1.80 | 1.05 | PROPIONYL | 2.85 | 160 | PLASTICIZER 1 | 6.0 | 85 | 10 | 60 | POLARIZING PLATE A | 6 | FAIR |
| EXAMPLE 8 | 0.05 | 2.90 | PROPIONYL | 2.95 | 170 | NONE | 0.0 | 75 | 6 | 28 | POLARIZING PLATE A | 2 | GOOD |
| EXAMPLE 9 | 0.20 | 2.00 | PROPIONYL | 2.20 | 140 | PLASTICIZER 2 | 15.0 | 75 | 3 | 41 | POLARIZING PLATE B | 1 | GOOD |
| EXAMPLE 10 | 0.10 | 1.95 | PROPIONYL | 2.05 | 150 | PLASTICIZER 4 | 20.0 | 140 | 2 | 18 | POLARIZING PLATE B | 3 | GOOD |
| EXAMPLE 11 | 0.20 | 2.60 | BUTYRYL | 2.80 | 200 | PLASTICIZER 4 | 8.0 | 80 | 9 | 59 | POLARIZING PLATE A | 4 | FAIR |
| EXAMPLE 12 | 1.10 | 1.72 | BUTYRYL | 2.82 | 180 | PLASTICIZER 4 | 6.0 | 85 | 8 | 55 | POLARIZING PLATE A | 5 | FAIR |

PLASTICIZER 1: BIPHENYL DIPHENYL PHOSPHATE
PLASTICIZER 2: DIOCTYL ADIPATE
PLASTICIZER 3: GLYCEROL DIACETATE MONOOLEATE
PLASTICIZER 4: POLYETHYLENE GLYCOL (MOLECULAR WEIGHT: 600)
COLOR TONE CHANGE IN POLARIZING PLATE*: THE DEGREE OF COLOR TONE CHANGE IS EVALUATED ON A 10-POINT SCALE (IN WHICH COLOR CHANGE IS LARGER AS THE POINT IS HIGHER).

CELLULOSE ACYLATE RESIN FILM AND METHOD FOR PRODUCING THE SAME

BACKGROUND OF THE INVENTION

1. Field of the Invention

The present invention relates to a cellulose acylate resin film and a method for producing the same. More particularly, the present invention relates to a cellulose acylate resin film used in a liquid crystal display and a method for producing the same.

2. Description of the Related Art

A cellulose acylate resin film is obtained by melting a cellulose acylate resin in an extruder, discharging the molten resin from a die to form a sheet, cooling the sheet on a cooling drum and releasing the sheet therefrom (see Japanese Patent Application Laid-Open No. 2000-352620, for example). The cellulose acylate resin film is stretched in the longitudinal (lengthwise) direction and in the transverse (crosswise) direction to exhibit in-plane retardation (Re) and retardation in the thickness direction (Rth). The film is used as a retardation film for a liquid crystal display element to expand the view angle.

SUMMARY OF THE INVENTION

However, a cellulose acylate resin tends to be degraded by heating. The resin tends to be discolored due to thermal degradation when sufficiently molten at a high melting temperature in an extruder. On the other hand, the resin is insufficiently molten when the melting temperature is reduced to prevent discoloration, and the film has thickness non-uniformity due to a fluctuation in the discharge pressure from an extruder to a die, disadvantageously. Such discoloration and thickness non-uniformity make the film seriously defective for use as an optical film.

A cellulose acylate resin is typically synthesized using a pulp as a raw material, and the synthesized resin is in the form of a powder or flakes. However, such a resin in the form of a powder or flakes causes clogging of an extruder. For this reason, conventionally, the resin in the form of a powder or flakes is once pelletized in a pelletizing extruder, and then the pellets are melt-extruded in an extruder. This promotes discoloration of the resin, disadvantageously.

The present invention has been achieved in view of such a situation. An object of the present invention is to provide a cellulose acylate resin film and a method for producing the same, which can reduce discoloration and thickness non-uniformity and can produce a high-quality film.

To attain the aforementioned object, according to a first aspect of the present invention, there is provided a method for producing a cellulose acylate resin film comprising a melt-extrusion step of melting a cellulose acylate resin in an extruder and extruding the molten cellulose acylate resin to a die, wherein the melt-extrusion step is carried out using a tandem extruder having a first-stage extruder and a second-stage extruder connected in tandem.

As a result of examining the reason why a cellulose acylate resin film produced has discoloration or thickness non-uniformity, the present inventors have found that thermal degradation and melting non-uniformity cause discoloration or thickness non-uniformity in the produced film.

According to the first aspect, the melt-extrusion step of melting a cellulose acylate resin in an extruder and extruding the molten resin to a die employs a tandem extruder having a first-stage extruder and a second-stage extruder connected in tandem. Thus, a resin can be molten in the first-stage extruder, and the molten resin can be measured in the second-stage extruder and discharged to the die. Since this makes a load in each of the extruders smaller than a load in one extruder used for melt-extrusion, a cellulose acylate resin can be sufficiently molten in the first-stage extruder at a melting temperature lower than in a conventional case, and the molten resin can be measured in the second-stage extruder and fed to the die at a stable discharge pressure. Because of this, a cellulose acylate resin film having excellent optical properties without discoloration or thickness non-uniformity can be produced.

According to a second aspect of the present invention, there is provided the method for producing a cellulose acylate resin film according to the first aspect, wherein a reservoir tank having a heating device is provided between the first-stage extruder and the second-stage extruder to absorb the fluctuation in pressure between the first-stage extruder and the second-stage extruder.

According to the second aspect, the reservoir tank having a heating device is provided between the first-stage extruder and the second-stage extruder, and it is difficult for the second-stage extruder to be influenced by the fluctuation in discharge pressure in the first-stage extruder. For this reason, the fluctuation in discharge pressure in the second-stage extruder can be reduced, and the film thickness can be less uneven.

According to a third aspect of the present invention, there is provided the method for producing a cellulose acylate resin film according to the second aspect, wherein the reservoir tank has a head space part filled with an inert gas.

According to the third aspect, the head space part in the reservoir tank is filled with an inert gas, so that resin degradation can be prevented, and thus discoloration can be prevented.

According to a fourth aspect of the present invention, there is provided the method for producing a cellulose acylate resin film according to the third aspect, wherein the amount and/or the pressure of the molten cellulose acylate resin in the reservoir tank are controlled to be constant.

According to the fourth aspect, the amount and/or the pressure of the molten cellulose acylate resin in the reservoir tank are controlled to be constant, so that the fluctuation in discharge pressure in the second-stage extruder can be reduced, and the film thickness can be less uneven.

According to a fifth aspect of the present invention, there is provided the method for producing a cellulose acylate resin film according to any one of the first to fourth aspects, wherein the cellulose acylate resin before melting is in the form of a powder or flakes.

According to the fifth aspect, the cellulose acylate resin before melting is in the form of a powder or flakes, so that pelletization of a resin as in a conventional case can be omitted, meaning that the times of melting a resin can be reduced, and accordingly discoloration of the resin can be prevented. Therefore, a cellulose acylate resin film can be produced in a stable manner.

According to a sixth aspect of the present invention, there is provided the method for producing a cellulose acylate resin film according to any one of the first to fifth aspects, wherein a twin-screw extruder is used as the first-stage extruder, and a single-screw extruder is used as the second-stage extruder.

According to the sixth aspect, a twin-screw extruder is used as the first-stage extruder, so that a cellulose acylate resin can be directly used in the form of a powder or flakes. Specifically, when a twin-screw extruder is used, even a resin in the form of a powder or flakes can be kneaded without clogging, and the resin can be kneaded more effectively and molten at a lower temperature. Since the cellulose acylate resin can be molten at a lower temperature as described above, there is a large difference between the processing temperature and the thermal decomposition temperature, discoloration of the resin due to thermal degradation can be prevented. When a single-screw extruder is used, it is preferable to once pelletize a raw material in the form of a powder or flakes in a kneader. However, when a twin-screw extruder is used, it is not necessary to carry out pelletization, and thus a processing work can be omitted. Further, the second-stage extruder used is a single-screw extruder having excellent measurement accuracy, so that a resin can be quantitatively extruder to the die.

According to a seventh aspect of the present invention, there is provided the method for producing a cellulose acylate resin film according to any one of the first to sixth aspects, wherein the first-stage extruder is a vent extruder.

According to the seventh aspect, the first-stage extruder is a vent extruder. For this reason, although moisture contained in the resin is evaporated during the melting process, the resulting air can be discharged from a vent, and thus hydrolysis of the resin can be prevented.

According to an eighth aspect of the present invention, there is provided the method for producing a cellulose acylate resin film according to any one of the first to seventh aspects, wherein the cellulose acylate resin has an acylate group satisfying the following substitution degree: $2.0 \leq X+Y \leq 3.0$, $0 \leq X \leq 2.0$, and $1.2 \leq Y \leq 2.9$, wherein X is a substitution degree of an acetyl group, and Y is a total substitution degree of a propionyl group, butyryl group, pentanoyl group, and hexanoyl group.

According to the eighth aspect, the cellulose acylate film satisfying such a substitution degree has a low melting temperature, is easily stretched, and exhibits excellent moisture resistance. Therefore, a cellulose acylate resin film excellent as a functional film such as a retardation film in a liquid crystal display element.

According to a ninth aspect of the present invention, there is provided the method for producing a cellulose acylate resin film according to any one of the first to eighth aspects, wherein an additive is added to the first-stage extruder.

According to the ninth aspect, an additive is added to the first-stage extruder, so that the additive can be effectively mixed with the cellulose acylate resin.

According to a tenth aspect of the present invention, there is provided a cellulose acylate resin film produced by the production method according to any of the first to ninth aspects. According to an eleventh aspect of the present invention, there is provided a polarizing plate comprising at least one stacked layer of the cellulose acylate resin film according to the tenth aspect. According to a twelfth aspect of the present invention, there is provided an optical compensation film for a liquid crystal display plate, comprising the cellulose acylate resin film according to the tenth aspect used as a substrate. According to a thirteenth aspect of the present invention, there is provided an antireflection film comprising the cellulose acylate resin film according to the tenth aspect used as a substrate.

According to the present invention, the method for producing a cellulose acylate resin film comprising a melt-extrusion step carried out using a tandem extruder having a first-stage extruder and a second-stage extruder connected in tandem. Thus, a cellulose acylate resin before melting is molten in the first-stage extruder while kneading, and the molten cellulose acylate resin is measured in the second-stage extruder and extruded to a die, so that the discharge pressure to the die can be made stable. Accordingly, the thickness of the film can be less uneven, and a highly functional film with high quality excellent for optical applications can be provided.

BRIEF DESCRIPTION OF THE DRAWINGS

FIG. 4 is a table for describing examples of the present invention; and

FIG. 5 is a table for describing examples of the present invention.

DETAILED DESCRIPTION OF THE PREFERRED EMBODIMENTS

Preferred embodiments of the cellulose acylate film and the method for producing the same of the present invention will be described below with reference to the accompanying drawings.

Figure 1:
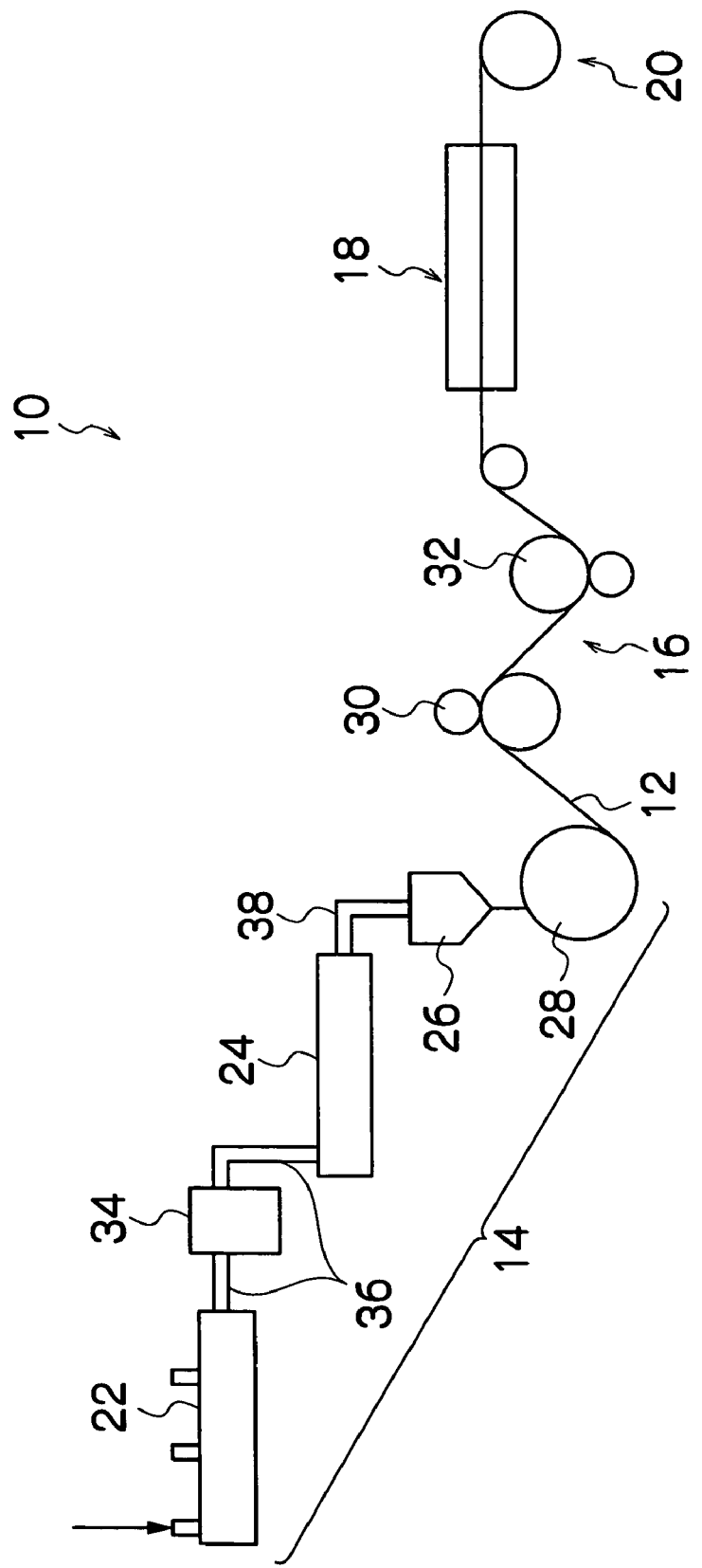
FIG. 1 is a view showing a configuration of a film production apparatus to which the present invention is applied.

FIG. 1 schematically shows an example of a configuration of an apparatus for producing a cellulose acylate film. As shown in FIG. 1, a production apparatus 10 is mainly constituted by a film-forming step section 14 of producing a cellulose acylate film 12 before stretching, a longitudinal stretching step section 16 of stretching the cellulose acylate film 12 produced in the film-forming step section 14 longitudinally, a transverse stretching step section 18 of transversely stretching the cellulose acylate film 12, and a winding step section 20 of winding the stretched cellulose acylate film 12.

In the film-forming step section 14, a cellulose acylate resin molten in a first-stage extruder 22 is measured in a second-stage extruder 24, the molten resin is extruded to a die 26 and then discharged from the die 26 to form a sheet, and the sheet is cast on a rotating cooling drum 28 and rapidly cooled and solidified to obtain the cellulose acylate film 12. The cellulose acylate film 12 is released from the cooling drum 28, fed to and stretched in the longitudinal stretching step section 16 and the transverse stretching step section 18 in this order, and rolled in the winding step section 20. The stretched cellulose acylate film 12 is produced in this manner. Details of each step section will be described below.

Figure 2:
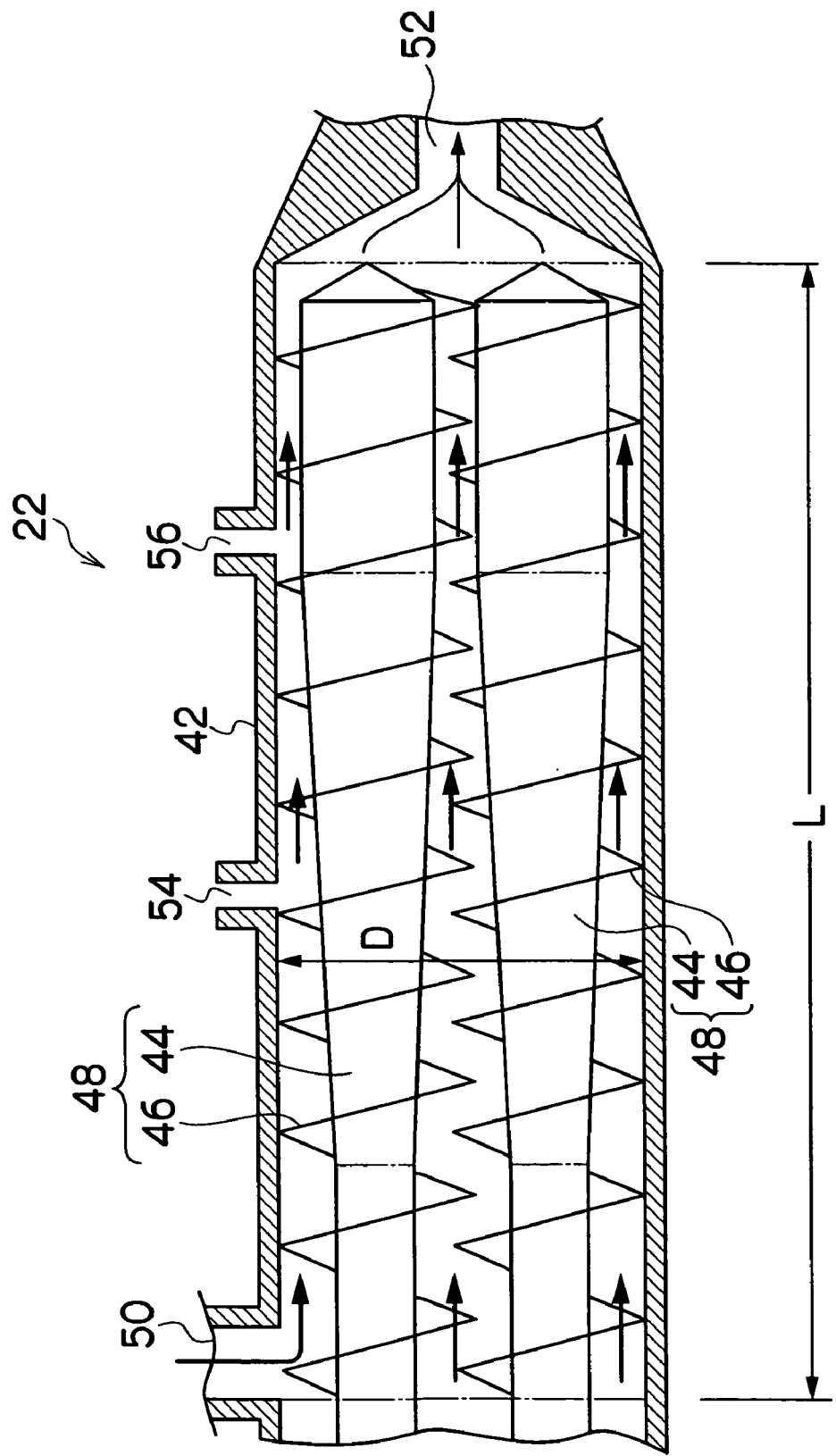
FIG. 2 is a schematic view showing a configuration of a first-stage extruder.

FIG. 2 shows a configuration of the first-stage extruder 22. As shown in the figure, the first-stage extruder 22 is a twin-screw vent extruder having a cylinder 42 provided with two screws 48, 48. Each screw 48 has a screw shaft 44 with a screw blade 46 attached thereto, is rotatably supported, and is rotationally driven by a motor (not shown). In the first-stage extruder 22, the two screw shafts 44, 44 may be located in parallel, or the two screw shafts 44, 44 may be inclined to each other. The two screw shafts 44, 44 may be rotated in the same direction or in different directions. Air or moisture contained in the cellulose acylate resin in the melting process is removed from vents 54, 56.

A jacket (not shown) is attached to the periphery of the cylinder 42, so that the cylinder is controlled to be at a desired temperature. In this temperature control, the temperature of the resin by shear heating is controlled to be not more than 240° C. A hopper is provided in a feed port 50 of the cylinder 42 through a quantitative feeding unit (feeder) (not shown). The cellulose acylate resin is introduced into the hopper, and is fed into the cylinder 42 through the quantitative feeding unit.

As the cellulose acylate resin, a resin having a molecular weight of 20,000 to 80,000, preferably 30,000 to 70,000, and more preferably 35,000 to 60,000 is used. If the molecular weight is less than a value in the above range, the produced cellulose acylate film 12 has decreased mechanical strength. On the other hand, if the molecular weight is more than a value in the above range, the molten resin has a high viscosity, and thus it is necessary to set the processing temperature to be high. As a result, the processing temperature is close to the thermal decomposition temperature, meaning that the resin is discolored due to thermal degradation, foreign matters are generated, and the film has deteriorated appearance. Accordingly, when the cellulose acylate resin having the above-described molecular weight is used, the produced cellulose acylate film 12 can have sufficient mechanical strength, and the cellulose acylate film 12 can have improved appearance.

The cellulose acylate resin may be introduced into the hopper in the first-stage extruder 22 in the form of a powder or flakes, or may be first pelletized and introduced into the hopper. Since the present embodiment employs the twin-screw first stage extruder 22, the cellulose acylate resin in the form of a powder or flakes may be introduced without pelletization, and working efficiency can be improved.

Further, an additive such as a plasticizer or Re exhibiting agent (optical anisotropy controlling agent) is added to the cellulose acylate resin as necessary. However, since the twin-screw vent extruder is used in the present invention, an additive may be added from the vent 54 or 56, not from the feed port 50. When an additive is introduced into the vent 54 or 55, since the cellulose acylate resin is molten in the vent 54 or 56, the additive is more easily mixed with the resin, and a load on an additive susceptible to heat can be reduced.

L/D in the first-stage extruder 22 is set at 20 to 55. L/D is a ratio of the cylinder length (L) to the cylinder inner diameter (D) in FIG. 2. The extrusion temperature is set at 180 to 230° C. If L/D is less than 20 and too small, the resin is insufficiently molten or kneaded, and microcrystals easily remain in the produced cellulose acylate film 12 as in the case where the compression ratio is small. If L/D is more than 55 and too high, the cellulose acylate resin is resided in the first-stage extruder 22 for a too long time, and the resin is easily degraded. If the residence time is long, molecular cutting occurs, the molecular weight is decreased, and thus the film has decreased mechanical strength. Accordingly, in order to make it difficult for the produced cellulose acylate film 12 to show yellowness or be broken by stretching, L/D is appropriately 20 to 55, preferably 22 to 50, and particularly preferably 25 to 45.

If the extrusion temperature is less than 180° C. and too low, crystals are insufficiently molten, and microcrystals easily remain in the produced cellulose acylate film 12. Thus, when the cellulose acylate film 12 is stretched, stretchability is suppressed, and sufficient orientation cannot be achieved. On the other hand, if the extrusion temperature is more than 230° C. and too high, the cellulose acylate resin is degraded, and the degree of yellowness (YI value) is increased. Accordingly, in order to make it difficult for the produced cellulose acylate film 12 to show yellowness or be broken by stretching, the extrusion temperature is appropriately 180° C. to 230° C., preferably 190° C. to 225° C., and particularly preferably 200° C. to 220° C.

As shown in FIG. 1, the cellulose acylate resin molten as described above is extruded to a reservoir tank 34 through a pipe 36. A jacket (not shown) is attached to the periphery of the reservoir tank 34 and the pipe 36, so that the cylinder is controlled to be at a desired temperature. The temperature is appropriately adjusted to the extrusion temperature of the first-stage extruder 22. The reservoir tank 34 is filled with an inert gas. By filling the tank with an inert gas, deterioration of the resin can be prevented, and thus discoloration can be prevented.

The amount of resin and/or the pressure in the reservoir tank 34 are made constant. The amount of resin can be made constant by controlling the rotational frequency of the screw in the first-stage extruder 22. The pressure can be made constant by controlling the pressure in filling with an inert gas.

When the reservoir tank 34 is provided in this manner, it is difficult for the second-stage extruder 24 to be influenced by the fluctuation in discharge pressure in the first-stage extruder 22, and thus the fluctuation in discharge pressure in the second-stage extruder 24 can be minimized.

Figure 3:
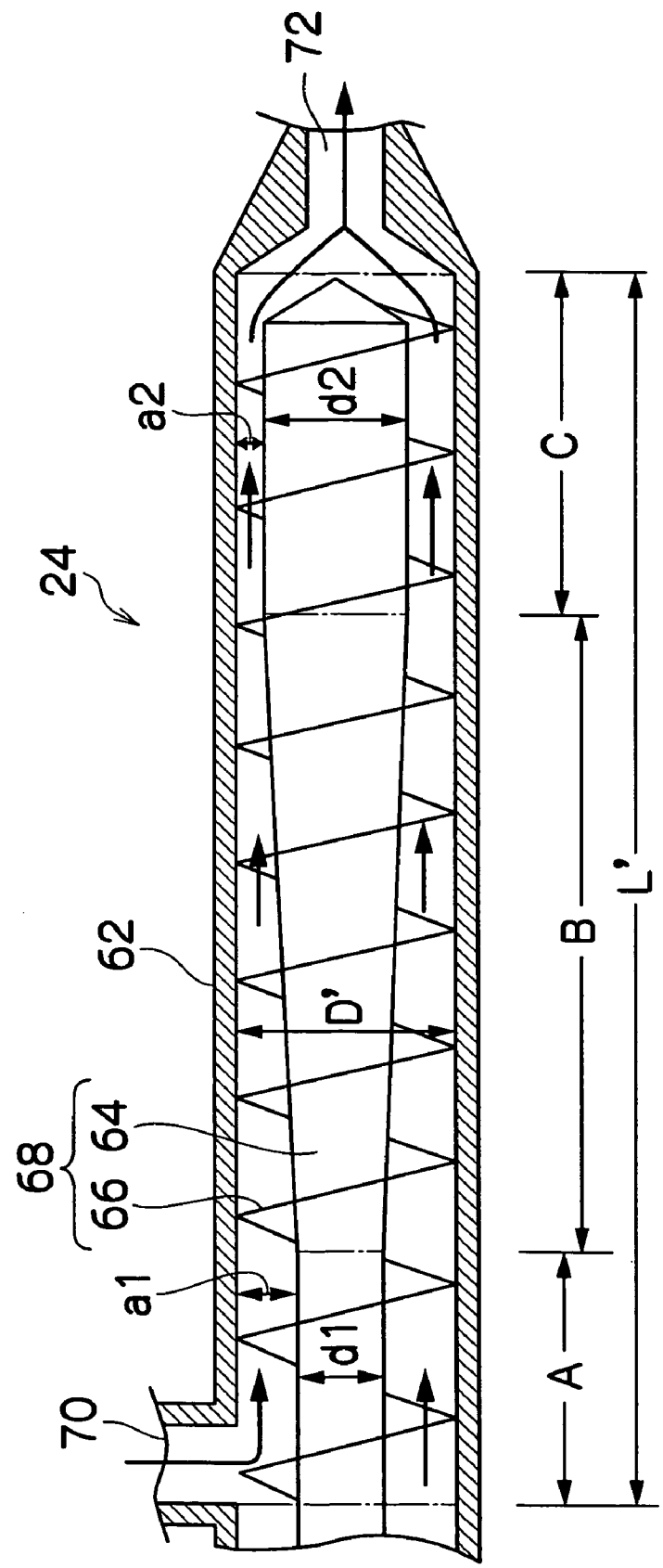
FIG. 3 is a schematic view showing a configuration of a second-stage extruder.

FIG. 3 shows a configuration of the second-stage extruder 24. The molten cellulose acylate resin is fed into a cylinder 62 through a feed port 70. As shown in the figure, a single screw 68 in which a flight 66 is attached to a screw shaft 64 is provided in the cylinder 62 in the second-stage extruder 24, and the single screw 68 is rotated by a motor (not shown).

The cylinder 62 is constituted by a feed section of quantitatively transporting the cellulose acylate resin fed from the feed port 70 (region shown by A), a compression section of kneading and compressing the cellulose acylate resin (region shown by B), and a measuring section of measuring the kneaded and compressed cellulose acylate resin (region shown by C) in this order from the feed port 70. The cellulose acylate resin molten in the second-stage extruder 24 is continuously fed to the die 26 from a discharge port 72 through a pipe 38.

In the second-stage extruder 24, the screw compression ratio is set at 4.5 or less, and L'/D' is set at 70 or less. Here, the screw compression ratio is represented by a volume ratio of the feed section A to the measurement section C, specifically, a value obtained by dividing a volume per unit length of the feed section A by a volume per unit length of the measurement section C. The ratio is calculated using an outer diameter d1 of the screw shaft 34 of the feed section A, an outer diameter d2 of the screw shaft 34 of the measurement section C, a groove diameter a1 of the feed section A, and a groove diameter a2 of the measurement section C. L'/D' is a ratio of the cylinder length (L') to the cylinder inner diameter (D') in FIG. 3. The extrusion temperature is set at 190 to 240° C.

The second-stage extruder 24 is preferably a single-screw extruder as shown in FIG. 3, because the resin must be quantitatively extruded. When the screw compression ratio is more than 4.5 and too high, shear stress is applied to the resin too much to make the resin easily degraded, and thus the produced cellulose acylate film easily shows yellowness. If shear stress is applied to the resin too much, molecular cutting occurs, the molecular weight is decreased, and thus the film has decreased mechanical strength.

If L'/D' is more than 70 and too high, the cellulose acylate resin is resided in the extruder 22 for a too long time, and the resin is easily degraded. If the residence time is long, molecular cutting occurs, the molecular weight is decreased, and thus the film has decreased mechanical strength.

If the extrusion temperature is more than 240° C. and too high, the cellulose acylate resin is degraded, and the degree of yellowness (YI value) is increased. Accordingly, in order to make the produced cellulose acylate film difficult to show yellowness, the extrusion temperature is preferably 240° C. or less, preferably 235° C. or less, and particularly preferably 230° C. or less.

The cellulose acylate film 12 produced using a tandem extruder having the first-stage extruder 22 and the second-stage extruder 24 connected in tandem, in which the extrusion conditions are determined as described above, has a haze of 2.0% or less and an yellowness index (YI value) of 10 or less.

Here, the haze is an index showing whether or not the extrusion temperature is too low, in other words, the amount of crystals remaining in the produced cellulose acylate film. If the haze is more than 2.0%, a large amount of microcrystals remain in the produced cellulose acylate film 12, and the cellulose acylate film 12 is easily broken by stretching. The yellowness index (YI value) is an index to know whether or not the melting temperature is too high. If the yellowness index (YI value) is 10 or less, the film has no problem in yellowness.

The cellulose acylate resin is molten in the tandem extruder configured as described above which has the first-stage extruder 22 and the second-stage extruder 24 connected in tandem. The molten resin is continuously fed to the die 26 (see FIG. 1) from the discharge port 72 in the second-stage extruder 24 through the pipe 38. The molten resin fed to the die 26 by the second-stage extruder 24 is extruded from the die 26 to form a sheet, and the sheet is cast on the cooling drum 28 and cooled and solidified to form the cellulose acylate film 12. In order to prevent thermal degradation or coloring, the temperature of the molten polymer when extruded from the die 26 is preferably Tg+70° C. to Tg+120° C. When the lip clearance of the die 24 is defined as D and the thickness of the molten resin discharged from the die 26 is defined as W, it is preferable to control the lip clearance ratio D/W in the range of 1.5 to 10. Further, the slit of the die 26 is preferably formed in a direction between the vertical direction and the direction inclined at 45° with respect to the rotating direction of the cooling drum 28.

The cellulose acylate film 12 formed in the film-forming step section 14 is stretched in the longitudinal stretching step section 16 and the transverse stretching step section 18.

The stretching step in which the cellulose acylate film 12 formed in the film-forming step section 14 is stretched to produce the stretched cellulose acylate film 12 will be described below.

The cellulose acylate film 12 is stretched to make molecules in the cellulose acylate film 12 oriented and allow the film to exhibit in-plane retardation (Re) and retardation in the thickness direction (Rth). Here, the retardations Re, Rth are determined by the following formulas:

$$Re(nm) = |n(MD) - n(TD)| \times T(nm)$$

$$Rth(nm) = |\{(n(MD) + n(TD))/2\} - n| \times T(nm)$$

wherein n (m), n (TD) and n (TH) represent a refractive index in the lengthwise direction, a refractive index in the crosswise direction and a refractive index in the thickness direction, respectively, and T represents a thickness in nm.

As shown in FIG. 1, the cellulose acylate film 12 is first longitudinally stretched in the lengthwise direction in the longitudinal stretching step section 16. In the longitudinal stretching step section 16, the cellulose acylate film 12 is preheated, and the cellulose acylate film 12 in the state of being heated is wound around two nip rolls 30, 32. The nip roll 32 on the outlet side transports the cellulose acylate film 12 at a speed higher than in the nip roll 30 on the inlet side. Thus, the cellulose acylate film 12 is longitudinally stretched.

The preheating temperature in the longitudinal stretching step section 16 is preferably Tg−40° C. to Tg+60° C., more preferably Tg−20° C. to Tg+40° C., and still more preferably Tg to Tg+30° C. The stretching temperature in the longitudinal stretching step section 16 is preferably Tg to Tg+60° C., more preferably Tg+2° C. to Tg+40° C., and still more preferably Tg+5° C. to Tg+30° C. The longitudinal stretching ratio is preferably 1.0 to 2.5, and more preferably 1.1 to 2.

The longitudinally stretched cellulose acylate film 12 is fed to the transverse stretching step section 18 and transversely stretched in the crosswise direction. In the transverse stretching step section 18, a tenter can be suitably used. The tenter transversely stretches the cellulose acylate film 12 with both ends in the crosswise direction held by clips. This transverse stretching can further increase the retardation Rth.

The transverse stretching is preferably carried out using a tenter. The stretching temperature is preferably Tg to Tg+60° C., more preferably Tg+2° C. to Tg+40° C., and still more preferably Tg+4° C. to Tg+30° C. The stretching ratio is preferably 1.0 to 2.5, and more preferably 1.1 to 2.0. After the transverse stretching, the film is also preferably relaxed in the longitudinal direction, the transverse direction, or both. This can make the slow axis distribution in the crosswise direction narrow.

As a result of such stretching, Re is 0 nm to 500 nm, more preferably 10 nm to 400 nm, and still more preferably 15 nm to 300 nm, and Rth is 0 nm to 500 nm, more preferably 50 nm to 400 nm, and still more preferably 70 nm to 350 nm.

The relation between Re and Rth more preferably satisfies Re≦Rth, and more preferably satisfies Re×2≦Rth. In order to achieve such high Rth and low Re, the film longitudinally stretched as described above is preferably stretched in the transverse (crosswise) direction. Specifically, the difference between the longitudinal orientation and the transverse orientation is the in-plane retardation (Re), and when the film is stretched both in the longitudinal direction and in the transverse direction perpendicular to the longitudinal direction, the difference between the longitudinal orientation and the transverse orientation can be small, and in-plane orientation (Re) can be small. On the other hand, since the area magnification is increased by stretching the film both longitudinally and transversely, the orientation in the thickness direction and Rth can be increased as the thickness is decreased.

The fluctuation in Re or Rth in the crosswise or lengthwise direction depending on locations is preferably 5% or less, more preferably 4% or less, and still more preferably 3% or less.

The stretched cellulose acylate film 12 is rolled in the winding step section 20 in FIG. 1. In this case, the cellulose acylate film 12 is preferably wound at a tension of 0.02 kg/mm² or less. By setting the winding tension within this range, the stretched cellulose acylate film 12 can be wound with no retardation distribution formed.

The cellulose acylate resin and the method for producing a cellulose acylate resin film suitable for the present invention will be described in detail below according to the procedure.

(1) Plasticizer

A polyhydric alcohol plasticizer is preferably added to a resin for producing a cellulose acylate film in the present invention. Such a plasticizer does not only reduce elasticity but also reduces the difference in crystal amount between the front surface and the back surface.

The content of the polyhydric alcohol plasticizer is preferably 2 to 20 wt % based on cellulose acylate. The content of the polyhydric alcohol plasticizer is preferably 2 to 20 wt %, more preferably 3 to 18 wt %, and still more preferably 4 to 15 wt %.

If the content of the polyhydric alcohol plasticizer is less than 2 wt %, the above effects cannot be sufficiently achieved. If more than 20 wt %, weeping (deposition of the plasticizer on the surface) occurs.

Polyol plasticizers practically used in the present invention include: for example, glycerin-based ester compounds such as glycerin ester and diglycerin ester; polyalkylene glycols such as polyethylene glycol and polypropylene glycol; and compounds in which an acyl group is bound to the hydroxyl group of polyalkylene glycol, all of which are highly compatible with cellulose fatty acid ester and produce remarkable thermoplasticization effect.

Specific examples of glycerin esters include: not limited to, glycerin diacetate stearate, glycerin diacetate palmitate, glycerin diacetate mystirate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate mystirate, glycerin dipropionate palmitate, glycerin dipropionate stearate, glycerin dipropionate oleate, glycerin tributyrate, glycerin tripentanoate, glycerin monopalmitate, glycerin monostearate, glycerin distearate, glycerin propionate laurate, and glycerin oleate propionate. Either any one of these glycerin esters alone or two or more of them in combination may be used.

Of these examples, preferable are glycerin diacetate caprylate, glycerin diacetate pelargonate, glycerin diacetate caprate, glycerin diacetate laurate, glycerin diacetate myristate, glycerin diacetate palmitate, glycerin diacetate stearate, and glycerin diacetate oleate.

Specific examples of diglycerin esters include: not limited to, mixed acid esters of diglycerin, such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramystyrate, diglycerin tetramyristylate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate mystyrate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimystyrate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimystyrate, diglycerin acetate trimyristylate, diglycerin acetate tripalmitate, diglycerin acetate tristearate, diglycerin acetate trioleate, diglycerin laurate, diglycerin stearate, diglycerin caprylate, diglycerin myristate, and diglycerin oleate. Either any one of these diglycerin esters alone or two or more of them in combination may be used.

Of these examples, diglycerin tetraacetate, diglycerin tetrapropionate, diglycerin tetrabutyrate, diglycerin tetracaprylate and diglycerin tetralaurate are preferably used.

Specific examples of polyalkylene glycols include: not limited to, polyethylene glycols and polypropylene glycols having an average molecular weight of 200 to 1000. Either any one of these examples or two of more of them in combination may be used.

Specific examples of compounds in which an acyl group is bound to the hydroxyl group of polyalkylene glycol include: not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate, and polyoxypropylene linoleate. Either any one of these examples or two or more of them in combination may be used.

To allow these polyols to fully exert the above described effects, it is preferable to perform the melt film forming of cellulose acylate under the following conditions. Specifically, in the film formation process where pellets of the mixture of cellulose acylate and polyol are melt in an extruder and extruded through a T-die, it is preferable to set the temperature of the extruder outlet (T2) higher than that of the extruder inlet (T1), and it is more preferable to set the temperature of the die (T3) higher than T2. In other words, it is preferable to increase the temperature with the progress of melting. The reason for this is that if the temperature of the above mixture is rapidly increased at the inlet, polyol is first melt and liquefied, and cellulose acylate is brought to such a state that it floats on the liquefied polyol and cannot receive sufficient shear force from the screw, which results in occurrence of un-molten cellulose acylate. In such an insufficiently mixed mixture of polyol and cellulose acylate, polyol, as a plasticizer, cannot exert the above described effects; as a result, the occurrence of the difference between both sides of the melt film after melt extrusion cannot be effectively suppressed. Furthermore, such inadequately molten matter results in a fish-eye-like contaminant after the film formation. Such a contaminant is not observed as a brilliant point even through a polarizer, but it is visible on a screen when light is projected into the film from its back side. Fish eyes may cause tailing at the outlet of the die, which results in increased number of die lines.

T1 is preferably in the range of 150 to 200° C., more preferably in the range of 160 to 195° C., and more preferably in the range of 165 to 190° C. T2 is preferably in the range of 190 to 240° C., more preferably in the range of 200 to 230° C., and more preferably in the range of 200 to 225° C. It is most important that such melt temperatures T1, T2 are 240° C. or lower. If the temperatures are higher than 240° C., the modulus of elasticity of the formed film tends to be high. The reason is probably that cellulose acylate undergoes decomposition because it is melted at high temperatures, which causes crosslinking in it, and hence increase in modulus of elasticity of the formed film. The die temperature T3 is preferably 200 to less than 235° C., more preferably in the range of 205 to 230° C., and much more preferably in the range of 205 to 225° C.

(2) Stabilizer

In the present invention, it is preferable to use, as a stabilizer, either phosphite compound or phosphite ester compound, or both phosphite compound and phosphite ester compound. This enables not only the suppression of film deterioration with time, but the improvement of die lines. These compounds function as a leveling agent and get rid of the die lines formed due to the irregularities of the die.

The amount of these stabilizers mixed is preferably 0.005 to 0.5% by weight, more preferably 0.01 to 0.4% by weight, and much more preferably 0.02 to 0.3% by weight of the resin mixture.

(i) Phosphite Stabilizer

Specific examples of preferred phosphite color protective agents include: not limited to, phosphite color protective agents expressed by the following chemical formulas (general formulas) (1) to (3).

Chemical Formula (1)

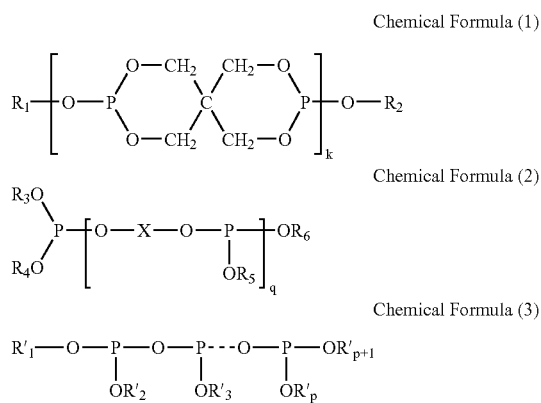

Chemical Formula (2)

Chemical Formula (3)

(In the above chemical formulas, R1, R2, R3, R4, R5, R6, R'1, R'2, R'3 . . . R'n, R'n+1 each represent hydrogen or a group selected from the group consisting of alkyl, aryl, alkoxyalkyl, aryloxyalkyl, alkoxyaryl, arylalkyl, alkylaryl, polyaryloxyalkyl, polyalkoxyalkyl and polyalkoxyaryl which have 4 or more and 23 or less carbon atoms. However, in the chemical formulas (1), (2) and (3), at least one substituent is not hydrogen. X in the phosphite color protective agents expressed by the chemical formula (2) represents a group selected from the group consisting of aliphatic chain, aliphatic chain with an aromatic nucleus on its side chain, aliphatic chain including an aromatic nucleus in it, and the above described chains including two or more oxygen atoms not adjacent to each other k and q independently represents an integer of 1 or larger, and p an integer of 3 or larger.)

The k, q in the phosphite color protective agents are preferably 1 to 10. If the k, q are 1 or larger, the agents are less likely to volatilize when heating. If they are 10 or smaller, the agents have an improved compatibility with cellulose acetate propionate. Thus the k, q in the above range are preferable p is preferably 3 to 10. If the p is 3 or more, the agents are less likely to volatilize when heating. If the p is 10 or less, the agents have improved compatibility with cellulose acetate propionate.

Specific examples of preferred phosphite color protective agents expressed by the chemical formula (general formula) (1) below include phosphite color protective agents expressed by the chemical formulas (4) to (7) below.

Chemical Formula (1)

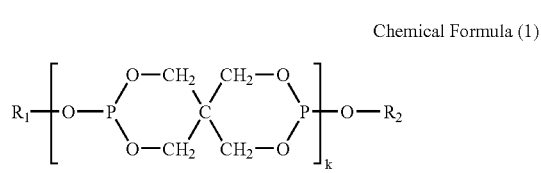

Chemical Formula (4)

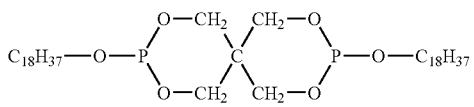

Chemical Formula (5)

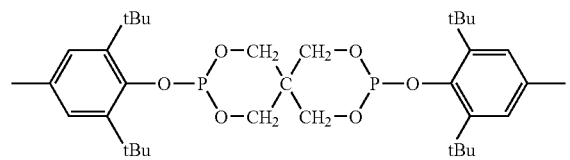

Chemical Formula (6)

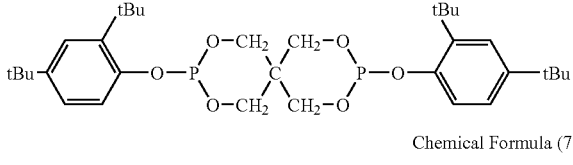

Chemical Formula (7)

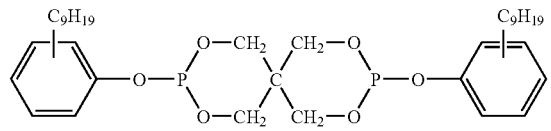

Specific examples of preferred phosphite color protective agents expressed by the chemical formula (general formula) (2) below include phosphite color protective agents expressed by the chemical formulas (8), (9) and (10) below.

Chemicla Formula (2)

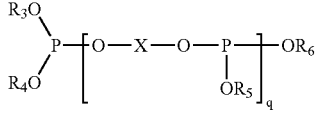

Chemical Formula (8)

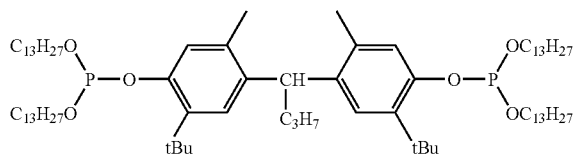

Chemical Formula (9)

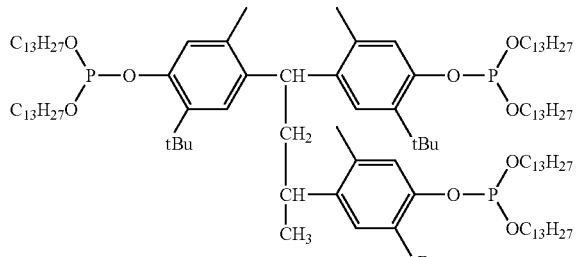

-continued

Chemical Formula (10)

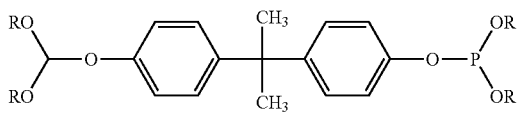

R = alkyl group with 12 to 15 carbon atoms (iii) Other Stabilizers

A weak organic acid, thioether compound, or epoxy compound, as a stabilizer, may be mixed with the resin mixture.

Any weak organic acids can be used as a stabilizer in the present invention, as long as they have a pKa of 1 or more, do not interfere with the action of the present invention, and have color preventive and deterioration preventive properties. Examples of such weak organic acids include: tartaric acid, citric acid, malic acid, fumaric acid, oxalic acid, succinic acid and maleic acid. Either any one of these acids alone or two or more of them in combination may be used.

Examples of thioether compounds include: dilauryl thiodipropionate, ditridecyl thiodipropionate, dimyristyl thiodipropionate, distearyl thiodipropionate, and palmityl stearyl thiodipropionate. Either any one of these compounds alone or two or more of them in combination may be used.

Examples of epoxy compounds include: compounds derived from epichlorohydrin and bisphenol A. Derivatives from epichlorohydrin and glycerin or cyclic compounds such as vinyl cyclohexene dioxide or 3,4-epoxy-6-methylcyclohexylmethyl-3,4-epoxy-6-methylcyclohexane carboxylate can also be used. Epoxydized soybean oil, epoxydized castor oil or long-chain α-olefin oxides can also be used. Either any one of these compounds alone or two or more of them in combination may be used.

(3) Cellulose Acylate

<<Cellulose Acylate Resin>>

(Composition, Degree of Substitution)

A cellulose acylate that satisfies all of the requirements expressed by the following formulas (1) to (3) is preferably used in the present invention.

$2.0 \leq X+Y \leq 3.0$      formula (1)

$0 \leq X \leq 2.0$      formula (2)

$1.2 \leq Y \leq 2.9$      formula (3)

(In the above formulas (1) to (3), X represents the substitution degree of acetate group and Y represents the sum of the substitution degrees of propionate group, butyrate group, pentanoyl group and hexanoyl group.)

A cellulose acylate that satisfies all of the requirements expressed by the following formulas (4) to (6) is more preferably used in the present invention.

$2.4 \leq X+Y \leq 3.0$      formula (4)

$0.05 \leq X \leq 1.8$      formula (5)

$1.3 \leq Y \leq 2.9$      formula (6)

A cellulose acylate that satisfies all of the requirements expressed by the following formulas (7) to (9) is still more preferably used in the present invention.

$2.5 \leq X+Y \leq 2.95$      formula (7)

$0.1 \leq X \leq 1.6$      formula (8)

$1.4 \leq Y \leq 2.9$      formula (9)

Thus, the cellulose acylate resin used in the present invention is characterized in that it has propionate, butyrate, pentanoyl and hexanoyl groups introduced into it. Setting the substitution degrees in the above described range is preferable because it enables the melt temperature to be decreased and the pyrolysis caused by melt film formation to be suppressed. Conversely, setting the substitution degrees outside the above described range is not preferable, because it allows the modulus of elasticity of the film to be outside the range of the present invention.

Either any one of the above cellulose acylates alone or two or more of them in combination may be used. A cellulose acylate into which a polymeric ingredient other than cellulose acylate has been properly mixed may also be used.

In the following a method for producing the cellulose acylate according to the present invention will be described in detail. The raw material cotton for the cellulose acylate according to the present invention or method for synthesizing the same are described in detail in Journal of Technical Disclosure (Laid-Open No. 2001-1745, issued on Mar. 15, 2001, Japan Institute of Invention and Innovation), pp. 7-12.

(Raw Materials and Pretreatment)

As a raw material for cellulose, one from broadleaf pulp, conifer pulp or cotton linter is preferably used. As a raw material for cellulose, a material of high purity whose α-cellulose content is 92% by mass or higher and 99.9% by mass or lower is preferably used.

When the raw material for cellulose is a film-like or bulk material, it is preferable to crush it in advance, and it is preferable to crush the material to such a degree that the cellulose is in the form of fluff.

(Activation)

Preferably, the cellulose material undergoes treatment, prior to acylation, where it is brought into contact with an activator (activation). As an activator, a carboxylic acid or water can be used. When water is used, it is preferable to carry out, after the activation, the steps of: adding excess acid anhydride to the material to dehydrate it; washing the material with carboxylic acid to replace water; and control the acylation conditions. The activator can be controlled to any temperature before it is added to the material, and a method for its addition can be selected from the group consisting of spraying, dropping and dipping.

Carboxylic acids preferably used as an activator are those having 2 or more and 7 or less carbon atoms (e.g. acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid), more preferably acetic acid, propionic acid and butyric acid, and particularly preferably acetic acid.

When carrying out the activation, catalyst for acylation such as sulfuric acid can also be added according to the situation. However, addition of a strong acid such as sulfuric acid can sometimes promote depolymerization; thus, preferably the amount of the catalyst added is kept about 0.1% by mass to 10% by mass of the amount of the cellulose. Two or more activators may be used in combination or an acid anhydride of carboxylic acid having 2 or more and 7 or less carbon atoms may also be added.

The amount of activator(s) added is preferably 5% by mass or more of the amount of the cellulose, more preferably 10% by mass or more, and particularly preferably 30% by mass or more. If the amount of activator(s) is larger than the above described minimum value, preferably troubles such that the degree of activating the cellulose is lowered will not occur. The maximum amount of activator(s) added is not particularly limited, as long as it does not decrease the productivity; however, preferably the amount is 100 times the amount of the cellulose or less, in terms of mass, more preferably 20 times the amount of the cellulose or less, and particularly preferably 10 times the amount of the cellulose or less. Activation may be carried out by adding excess activator(s) to the cellulose and then decreasing the amount of the activator(s) through the operation of filtration, air drying, heat drying, distillation under reduced pressure or solvent replacement.

The activation duration is preferably 20 minutes or longer. The maximum duration is not particularly limited, as long as it does not affect the productivity; however, the duration is preferably 72 hours or shorter, more preferably 24 hours or shorter and particularly preferably 12 hours or shorter. The activation temperature is preferably 0° C. or higher and 90° C. or lower, more preferably 15° C. or higher and 80° C. or lower, and particularly preferably 20° C. or higher and 60° C. or lower. The process of the cellulose activation can also be carried out under pressure or reduced pressure. As a heating device, electromagnetic wave such as micro wave or infrared ray may be used.

(Acylation)

In the method for producing cellulose acylate of the present invention, a hydroxyl group of cellulose is preferably acylated by reacting carboxylic anhydride with cellulose using Bronsted acid or Lewis acid as a catalyst.

As a method for obtaining cellulose-mixed acylate, there can be used a method of reacting two carboxylic anhydrides as acylating agents with cellulose by mixing or sequentially adding them; a method of using a mixed acid anhydride of two carboxylic acids (for example, a mixed acid anhydride of acetic acid and propionic acid); a method of synthesizing a mixed acid anhydride (for example, a mixed acid anhydride of acetic acid and propionic acid) from a carboxylic anhydride and another carboxylic anhydride (for example, acetic anhydride and propionic anhydride) as raw materials in the reaction system and reacting the mixed acid anhydride with cellulose; a method of once synthesizing cellulose acylate having a substitution degree of less than 3 and further acylating the remaining hydroxyl groups with an acid anhydride or acid halide; or the like.

(Acid Anhydride)

Acid anhydrides of carboxylic acids preferably used are those of carboxylic acids having 2 or more and 7 or less carbon atoms, which include: for example, acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride and benzoic anhydride. More preferably used are acetic anhydride, propionic anhydride, butyric anhydride, valeric anhydride, hexanoic anhydride and heptanoic anhydride. And particularly preferably used are acetic anhydride, propionic anhydride and butyric anhydride.

To prepare a mixed ester, it is preferable to use two or more of these acid anhydrides in combination. Preferably, the mixing ratio of such acid anhydrides is determined depending on the substitution ratio of the mixed ester. Usually, excess equivalent of acid anhydride(s) is added to cellulose. Specifically, preferably 1.2 to 50 equivalents, more preferably 1.5 to 30 equivalents, and particularly preferably 2 to 10 equivalents of acid anhydride(s) is added to the hydroxyl group of cellulose.

(Catalyst)

As an acylation catalyst for the production of a cellulose acylate in the present invention, preferably a Bronsted acid or a Lewis acid is used. The definitions of Bronsted acid and Lewis acid are described in, for example, "Rikagaku Jiten (Dictionary of Physics and Chemistry)" $5^{th}$ edition (2000). Examples of preferred Bronsted acids include: sulfuric acid, perchloric acid, phosphoric acid and methanesulfonic acid, benzenesulfonic acid and p-toluenesulfonic acid. Examples of preferred Lewis acids include: zinc chloride, tin chloride, antimony chloride and magnesium chloride.

As the catalyst, sulfuric acid and perchloric acid are preferable, and sulfuric acid is particularly preferable. The amount of the catalyst added is preferably 0.1 to 30% by mass of the amount of cellulose, more preferably 1 to 15% by mass, and particularly preferably 3 to 12% by mass.

(Solvent)

When carrying out acylation, a solvent may be added to the reaction mixture so as to adjust the viscosity, reaction speed, ease of stirring or acyl substitution ratio of the reaction mixture. As such a solvent, dichloromethane, chloroform, a carboxylic acid, acetone, ethyl methyl ketone, toluene, dimethyl sulfoxide or sulfolane can be used. Preferably, a carboxylic acid is used. Examples of carboxylic acids include: for example, those having 2 or more and 7 or less carbon atoms, such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, and cyclopentanecarboxylic acid. Preferable are acetic acid, propionic acid and butyric acid. Tow or more of these solvents may be used in the form of a mixture.

(Acylation Conditions)

The acylation may be carried out in such a manner that a mixture of acid anhydride(s), catalyst and, if necessary, solvent(s) is prepared first and then the mixture is mixed with cellulose, or acid anhydride(s), catalyst and, if necessary, solvent(s) are mixed with cellulose one after another. Generally, it is preferable that a mixture of acid anhydride(s) and catalyst or a mixture of acid anhydride(s), catalyst and solvent(s) is prepared first and then the mixture, as an acylating agent, is reacted with cellulose. To suppress the temperature increase in the reactor due to the heat of reaction generated in the acylation, it is preferable to cool such an acylating agent in advance. The cooling temperature is preferably −50° C. to 20° C., more preferably −35° C. to 10° C., and particularly preferably −25° C. to 5° C. An acylating agent may be in the liquid state or in the frozen solid state when added. When added in the frozen solid state, the acylating agent may take the form of a crystal, flake or block.

Acylating agent(s) may be added to cellulose at one time or in installments. Or cellulose may be added to acylating agent(s) at one time or in installments. When adding acylating agent(s) in installments, either a single acylating agent or a plurality of acylating agents each having different compositions may be used. Preferred examples are: 1) adding a mixture of acid anhydride(s) and solvent(s) first and then adding catalyst; 2) adding a mixture of acid anhydride(s), solvent(s) and part of catalyst first and then adding a mixture of the rest of catalyst and solvent(s); 3) adding a mixture of acid anhydride(s) and solvent(s) first and then adding a mixture of catalyst and solvent(s); and 4) adding solvent(s) first and then adding a mixture of acid anhydride(s) and catalyst or a mixture of acid anhydride(s), catalyst and solvent(s).

In the method for producing a cellulose acylate of the present invention, the maximum temperature the reaction system reaches in the acylation is preferably 50° C. or lower, though the acylation of cellulose is exothermic reaction. The reaction temperature 50° C. or lower is preferable because it can prevent depolymerization from progressing, thereby avoiding such a trouble that a cellulose acylate having a polymerization degree suitable for the purpose of the present invention is hard to obtain. The maximum temperature the reaction system reaches in the acylation is preferably 45° C. or lower, more preferably 40° C. or lower, and particularly preferably 35° C. or lower. The reaction temperature may be controlled with a temperature control unit or by controlling the initial temperature of the acylating agent used. The reaction temperature can also be controlled by reducing the pressure in the reactor and utilizing the vaporization heat of the liquid component in the reaction system. Since the exothermic heat in the acylation is larger at the beginning of the reaction, the temperature control can be carried out by cooling the reaction system at the beginning and heating the same afterward. The end point of the acylation can be determined by means of the light transmittance, solvent viscosity, temperature change in the reaction system, solubility of the reaction product in an organic solvent or observation with a polarizing microscope.

The minimum temperature in the reaction is preferably −50° C. or higher, more preferably −30° C. or higher, and particularly preferably −20° C. or higher. Acylation duration is preferably 0.5 hours or longer and 24 hours or shorter, more preferably 1 hour or longer and 12 hours or shorter, and particularly preferably 1.5 hours or longer and 6 hours or shorter. If the duration is 0.5 hours or shorter, the reaction does not sufficiently progress under normal reaction conditions, while if the duration is longer than 24 hours, industrial production of a cellulose acylate is not preferably performed.
(Reaction Terminator)

In the method for producing a cellulose acylate used in the present invention, it is preferable to add a reaction terminator after the acylation reaction.

Any reaction terminator may be used, as long as it can decompose acid anhydride(s). Examples of preferred reaction terminators include: water, alcohols (e.g. ethanol, methanol, propanol and isopropyl alcohol), and compositions including the same. The reaction terminators may include a neutralizer as described later. In the addition of a reaction terminator, it is preferable not to add water or an alcohol directly, but to add a mixture with a carboxylic acid such as acetic acid, propionic acid or butyric acid, particularly preferably acetic acid, and water. Doing so prevents the generation of exothermic heat beyond the cooling ability of the reaction unit, thereby avoiding troubles such as decrease in polymerization degree of the cellulose acylate and precipitation of the cellulose acylate in the undesirable form. A carboxylic acid and water can be used at an arbitrary ratio; however, preferably the water content of the mixture is 5% by mass to 80% by mass, more preferably 10% by mass to 60% by mass, and particularly preferably 15% by mass to 50% by mass.

The reaction terminator may be added to the acylation reactor, or the reactants may be added to the container containing the reaction terminator. Preferably, the addition of the reaction terminator is performed spending 3 minutes to 3 hours. The reason for this is that if the time spent on the addition of the reaction terminator is 3 minutes or longer, it is possible to prevent too large an exothermic heat, thereby avoiding troubles, such as decrease in polymerization degree of the cellulose acylate, insufficient hydrolysis of acid anhydride(s), or decrease in stability of the cellulose acylate. And if the time spent on the addition of the reaction terminator is 3 hours or shorter, it is possible to avoid troubles such as decrease in industrial productivity. The time spent on the addition of the reaction terminator is preferably 4 minutes or longer and 2 hours or shorter, more preferably 5 minutes or longer and 1 hour or shorter, and much more preferably 10 minutes or longer and 45 minutes or shorter. The reactor not necessarily requires cooling when the reaction terminator is added; however, to suppress the progress of depolymerization, it is preferable to retard the temperature increase in the reactor by cooling the same. In this respect, cooling the reaction terminator before its addition is also preferable.
(Neutralizer)

In the acylation reaction termination step or after the acylation reaction termination step, to hydrolyze excess carboxylic anhydride remaining in the reaction system or neutralize part of or the whole carboxylic acid and esterifying catalyst in the same, a neutralizer (e.g. carbonate, acetate, hydroxide or oxide of calcium, magnesium, iron, aluminum or zinc) or its solution may be added. Preferred solvents for such a neutralizer include: for example, polar solvents such as water, alcohols (e.g. ethanol, methanol, propanol and isopropyl alcohol), carboxylic acids (e.g. acetic acid, propionic acid and butyric acid), ketones (e.g. acetone and ethyl methyl ketone) and dimethyl sulfoxide; and mixed solvents thereof.
(Partial Hydrolysis)

In the cellulose acylate thus obtained, the sum of the substitution degrees is approximately 3. Then, to obtain a cellulose acylate with desired substitution degree, generally the obtained cellulose acylate is kept at 20 to 90° C. in the presence of a small amount of catalyst (generally acylating catalyst such as remaining sulfuric acid) and water for several minutes to several days so that the ester linkage is partially hydrolyzed and the substitution degree of the acyl group of the cellulose acylate is decreased to a desired degree (so called aging). Since the sulfate ester of cellulose also undergoes hydrolysis during the process of the above partial hydrolysis, the amount of the sulfate ester bound to cellulose can also be decreased by controlling the hydrolysis conditions.

Preferably, the catalyst remaining in the reaction system is completely neutralized with a neutralizer as described above or the solution thereof at the time when a desired cellulose acylate is obtained so as to terminate the partial hydrolysis. It is also preferable to add a neutralizer which forms a salt slightly soluble in the reaction solution (e.g. magnesium carbonate and magnesium acetate) to effectively remove the catalyst (e.g. sulfuric ester) in the solution or bound to the cellulose.
(Filtration)

To remove the unreacted matter, slightly soluble salts or other contaminants in the cellulose acylate or to reduce the amount thereof, it is preferable to filter the reaction mixture (dope). The filtration may be carried out in any step after the completion of acylation and before the reprecipitation of the same. To control the filtration pressure or the handleability of the cellulose acylate, it is preferable to dilute the cellulose acylate with an appropriate solvent prior to filtration.
(Reprecipitation)

An intended cellulose acylate can be obtained by: mixing the cellulose acylate solution thus obtained into a poor solvent, such as water or an aqueous solution of a carboxylic acid (e.g. acetic acid and propionic acid), or mixing such a poor solvent into the cellulose acylate solution, to precipitate the cellulose acylate; washing the precipitated cellulose acylate; and subjecting the washed cellulose acylate to stabilization treatment. The reprecipitation may be performed continuously or in a batchwise operation. It is preferable to control the form of the reprecipitated cellulose acylate or the molecular weight distribution of the same by adjusting the concentration of the cellulose acylate solution and the composition of the poor solvent used according to the substitution pattern or the substitution degree of the cellulose acylate.
(Washing)

Preferably, the produced cellulose acylate undergoes washing treatment. Any washing solvent can be used, as long as it slightly dissolves the cellulose acylate and can remove impurities; however, generally water or hot water is used. The temperature of the washing water is preferably 25° C. to 100° C., more preferably 30° C. to 90° C., and particularly preferably 40° C. to 80° C. Washing may be carried out in so-called batch process where filtration and replacement are repeated or with continuous washing equipment. It is preferable to reuse, as a poor solvent, the liquid waste generated during the processes of reprecipitation and washing or to recover and reuse the solvent such as carboxylic acid by use of means such as distillation.

The progress of washing may be traced by any means; however, preferred means of tracing include: for example, hydrogen ion concentration, ion chromatography, electrical conductivity, ICP, elemental analysis, and atomic absorption spectrometry.

The catalyst (e.g. sulfuric acid, perchloric acid, trifluoroacetic acid, p-toluenesulfonic acid, methanesulfonic acid or zinc chloride), neutralizer (e.g. carbonate, acetate, hydroxide or oxide of calcium, magnesium, iron, aluminum or zinc), reaction product of the neutralizer and the catalyst, carboxylic acid (e.g. acetic acid, propionic acid or butyric acid), reaction product of the neutralizer and the carboxylic acid, etc. in the cellulose acylate can be removed by this washing treatment. This is highly effective in enhancing the stability of the cellulose acylate.
(Stabilization)

To improve the stability of the cellulose acylate and reduce the odor of the carboxylic acid, it is preferable to treat the cellulose acylate having been washed with hot water with an aqueous solution of weak alkali (e.g. carbonate, hydrogencarbonate, hydroxide or oxide of sodium, potassium calcium, magnesium or aluminum).

The amount of the residual purities can be controlled by the amount of washing solution, the temperature or time of washing, the method of stirring, the shape of washing container, or the composition or concentration of stabilizer. In the present invention, the conditions of acylation, partial hydrolysis and washing are set so that the residual sulfate group (on the basis of the sulfur atom content) is 0 to 500 ppm.
(Drying)

In the present invention, to adjust the water content of the cellulose acylate to a desirable value, it is preferable to dry the cellulose acylate. Any drying method can be employed to dry the cellulose acylate, as long as an intended water content can be obtained; however, it is preferable to carry out drying efficiently by either any one of the means such as heating, blast, pressure reduction and stirring alone or two or more of them in combination. The drying temperature is preferably 0 to 200° C., more preferably 40 to 180° C., and particularly preferably 50 to 160° C. The water content of the cellulose acylate of the present invention is preferably 2% by mass or less, more preferably 1% by mass or less, and particularly preferably 0.7% by mass or less.
(Form)

The cellulose acylate of the present invention can take various forms, such as particle, powder, fiber and bulk forms. However, as a raw material for films, the cellulose acylate is preferably in the particle form or in the powder form. Thus, the cellulose acylate after drying may be crushed or sieved to make the particle size uniform or improve the handleability. When the cellulose acylate is in the particle form, preferably 90% by mass or more of the particles used has a particle size of 0.5 to 5 mm. Further, preferably 50% by mass or more of the particles used has a particle size of 1 to 4 mm. Preferably, the particles of the cellulose acylate have a shape as close to a sphere as possible. And the apparent density of the cellulose acylate particles of the present invention is preferably 0.5 to 1.3, more preferably 0.7 to 1.2, and particularly preferably 0.8 to 1.15. The method for measuring the apparent density is specified in JIS K-7365.

The cellulose acylate particles of the present invention preferably have an angle of repose of 10 to 70 degrees, more preferably 15 to 60 degrees, and particularly preferably 20 to 50 degrees.
(Degree of Polymerization)

The average degree of polymerization of the cellulose acylate preferably used in the present invention is 100 to 300, preferably 120 to 250, and much more preferably 130 to 200. The average degree of polymerization can be determined by intrinsic viscosity method by Uda et al. (Kazuo Uda and Hideo Saitoh, Journal of the Society of Fiber Science and Technology, Japan, Vol. 18, No. 1, 105-120, 1962) or by the molecular weight distribution measurement by gel permeation chromatography (GPC). The determination of average degree of polymerization is described in detail in Japanese Patent Application Laid-Open No. 9-95538.

In the present invention, the weight average degree of polymerization/number average degree of polymerization of the cellulose acylate determined by GPC is preferably 1.6 to 3.6, more preferably 1.7 to 3.3, and much more preferably 1.8 to 3.2.

Of the above described kinds of cellulose acylate, either one kind alone or two or more kinds in combination may be used. Cellulose acylate properly mixed with a polymer ingredient other than cellulose acylate may also be used. The polymer ingredient mixed with cellulose acylate is preferably such that it is highly compatible with cellulose ester and its mixture with cellulose acylate, when formed into a film, has a transmission of 80% or more, preferably 90% or more and much more preferably 92% or more.
[Examples of Cellulose Acylate Synthesis]

Examples of cellulose acylate syntheses will be described in detail below; however, it should be understood that these examples are not intended to limit the present invention.

Synthesis Example 1

Synthesis of Cellulose Acetate Propionate 150 g of cellulose (broadleaf pulp) and 75 g of acetic acid were taken into a 5 L separable flask equipped with a reflux unit, as a reactor, and vigorously stirred for 2 hours while heated in an oil bath whose temperature is adjusted to 60° C. The cellulose thus pretreated was swelled and crushed and in the form of fluff. The reactor was then placed in an iced water bath at 2° C. for 30 minutes so that the cellulose was cooled.

Separately, a mixture of 1545 g of propionic anhydride, as an acylating agent, and 10.5 g of sulfuric acid was prepared, and the mixture was cooled to −30° C. and added, at one time, to the reactor containing the above described pretreated cellulose. After 30 minutes had elapsed, the internal temperature of the reactor was controlled, by increasing the temperature outside the reactor gradually, so that it reached 25° C. two hours after the addition of the acylating agent. The reactor was then cooled in an iced water bath at 5° C., the internal temperature was controlled so that it reached 10° C. 0.5 hours after the addition of the acylating agent and 23° C. two hours after the same, and the reaction mixture was stirred for 3 hours while keeping the internal temperature at 23° C. The reactor was then cooled in an iced water bath at 5° C. and 120 g of water-containing 25% by mass acetic acid having been cooled to 5° C. was added over 1-hour period. The internal temperature of the reactor was increased to 40° C. and stirred for 1.5 hours. Then, a solution obtained by dissolving magnesium acetate tetrahydrate in an amount, on the mole basis, two times of the amount of sulfuric acid in 50% by mass water-containing acetic acid was added to the reactor and stirred for 30 minutes. Then, 1 L of water-containing 25% by mass acetic acid, 500 mL of water-containing 33% by mass acetic acid, 1 L of water-containing 50% by mass acetic acid and 1 L of water were added in this order to precipitate cellulose acetate propionate. The resultant precipitate of cellulose acetate propionate was washed with hot water. The washing conditions were varied as shown in Table 1 to obtain different kinds of cellulose acetate propionate with different amount of residual sulfate group. After washing, each cellulose acetate propionate was put into an aqueous solution of 0.005% by mass calcium hydroxide at 20° C., stirred for 0.5 hours, further washed with water until the pH of the wash liquid reaches 7, and vacuum dried at 70° C.

The 1H-NMR and GPC measurements revealed that the degree of acetylization, degree of propionization and degree of polymerization of the resultant cellulose acetate propionate were 0.30, 2.63 and 320, respectively. The content of sulfate group was determined in accordance with ASTM D-817-96.

Synthesis Example 2

Synthesis of Cellulose Acetate Butyrate 100 g of cellulose (broadleaf pulp) and 135 g of acetic acid were taken into a 5 L separable flask equipped with a reflux unit, as a reactor, and allowed to stand for 1 hour while heated in an oil bath whose temperature is adjusted to 60° C. Then the mixture was stirred vigorously for 1 hour while heated in an oil bath whose temperature is adjusted to 60° C. The cellulose thus pretreated was swelled and crushed and in the form of fluff. The reactor was then placed in an iced water bath at 5° C. for 1 hour so that the cellulose was fully cooled.

Separately, a mixture of 1080 g of butyric anhydride, as an acylating agent, and 10.0 g of sulfuric acid was prepared, and the mixture was cooled to −20° C. and added, at one time, to the reactor containing the above described pretreated cellulose. After 30 minutes had elapsed, the mixture was allowed to react for 5 hours by increasing the temperature outside the reactor to 20° C. The reactor was then cooled in an iced water bath at 5° C., and 2400 g of water-containing 12.5% by mass acetic acid having been cooled to about 5° C. was added over 1-hour period. The internal temperature of the reactor was increased to 30° C. and the mixture was stirred for 1 hour. Then, 100 g of 50% by mass aqueous solution of magnesium acetate tetrahydrate was added to the reactor and stirred for 30 minutes. Then, 1000 g of acetic acid and 2500 g of water-containing 50% by mass acetic acid were added little by little to precipitate cellulose acetate butyrate. The resultant precipitate of cellulose acetate butyrate was washed with hot water. The washing conditions were varied to obtain different kinds of cellulose acetate butyrate with different amount of residual sulfate group. After washing, each cellulose acetate butyrate was put into an aqueous solution of 0.005% by mass calcium hydroxide, stirred for 0.5 hours, further washed with water until the pH of the wash liquid reaches 7, and vacuum dried at 70° C. The degree of acetylization, degree of butyrization and degree of polymerization of the resultant cellulose acetate butyrate were 0.84, 2.12 and 268, respectively.

(4) Other Additives (i) Matting Agent

Preferably, fine particles are added as a matting agent. Examples of fine particles used in the present invention include: those of silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferable because they can decrease the turbidity of the cellulose acylate film. Fine particles of silicon dioxide are particularly preferable. Preferably, the fine particles of silicon dioxide have an average primary particle size of 20 nm or less and an apparent specific gravity of 70 g/liter or more. Those having an average primary particle size as small as 5 to 16 nm are more preferable, because they enable the haze of the film produced to be decreased. The apparent specific gravity is preferably 90 to 200 g/liter or more and more preferably 100 to 200 g/liter more. The larger the apparent specific gravity, the more preferable, because fine particles of silicon dioxide having a larger apparent specific gravity make it possible to prepare a dispersion of higher concentration, thereby improving the haze and the agglomerates.

These fine particles generally form secondary particles having an average particle size of 0.1 to 3.0 μm, which exist as agglomerates of primary particles in a film and form irregularities 0.1 to 3.0 μm in size on the film surface. The average secondary particle size is preferably 0.2 μm or more and 1.5 μm or less, more preferably 0.4 μm or more and 1.2 μm or less, and most preferably 0.6 μm or more and 1.1 μm or less. The primary particle size and the secondary particle size are determined by observing the particles in the film with a scanning electron microscope and using the diameter of the circle circumscribing each particle as a particle size. The average particle size is obtained by averaging the 200 determinations resulting from observation at different sites.

As fine particles of silicon dioxide, those commercially available, such as Aerosil R972, R972V, R974, R812, 200, 200V, 300, R202, OX50 and TT600 (manufactured by Nippon Aerosil Co., LTD), can be used. As fine particles of zirconium oxide, those on the market under the trade name of Aerosil R976 and R811 (manufactured by Nippon Aerosil Co., LTD) can be used.

Of these fine particles, Aerosil 200V and Aerosil R972V are particularly preferable, because they are fine particles of silicon dioxide having an average primary particle size of 20 nm or less and an apparent specific gravity of 70 g/liter more and they produce a large effect of reducing friction coefficient of the optical film produced while keeping the turbidity of the same low.

(ii) Other Additives

Various additives other than the above described matting agent, such as ultraviolet light absorbers (e.g. hydroxybenzophenone compounds, benzotriazole compounds, salicylate ester compounds and cyanoacrylate compounds), infrared absorbers, optical adjustors, surfactants and odor-trapping agents (e.g. amine), can be added to the cellulose acylate of the present invention. The materials preferably used are described in detail in Journal of Technical Disclosure Laid-Open No. 2001-1745 (issued on Mar. 15, 2001, Japan Institute of Invention and Innovation), pp. 17-22.

As infrared absorbers, for example, those described in Japanese Patent Application Laid-Open No. 2001-194522 can be used, while as ultraviolet light absorbers, for example, those described in Japanese Patent Application Laid-Open No. 2001-151901 can be used. Both the infrared absorber content and the ultraviolet light absorber content of the cellulose acylate are preferably 0.001 to 5% by mass.

Examples of optical adjustors include retardation adjustors. And those described in, for example, Japanese Patent Application Laid-Open Nos. 2001-166144, 2003-344655, 2003-248117 and 2003-66230 can be used. The use of such a retardation adjustor makes it possible to control the in-plane retardation (Re) and the retardation across the thickness (Rth) of the film produced. Preferably, the amount of the retardation adjustor added is 0 to 10% by weight, more preferably 0 to 8% by weight, and much more preferably 0 to 6% by weight.

(5) Physical Properties of Cellulose Acylate Mixture

The above described cellulose acylate mixtures (mixtures of cellulose acylate, plasticizer, stabilizer and other additives) preferably satisfy the following physical properties.

(i) Loss in Weight

In the thermoplastic cellulose acetate propionate composition of the present invention, the loss in weight on heating at 220° C. is 5% by weight or less. The term "loss in weight on heating" herein used means the loss in weight at 220° C. of a sample when the temperature of the sample is increased from room temperature at a temperature increasing rate of 10° C./min in an atmosphere of nitrogen gas. The loss in weight on heating of cellulose acylate can be 5% by weight or less by allowing cellulose acylate film to take the above described mixture form. The loss in weight on heating of a cellulose acylate mixture is more preferably 3% by weight or less and much more preferably 1% by weight or less. Keeping the loss in weight on heating of a cellulose acylate mixture in the above described range makes it possible to suppress the trouble occurring in the film formation (generation of air bubbles).

(ii) Melt Viscosity

In the thermoplastic cellulose acetate propionate composition of the present invention, preferably the melt viscosity at 220° C., 1 sec$^{-1}$ is 100 to 1000 Pa·sec, more preferably 200 to 800 Pa·sec, and much more preferably 300 to 700 Pa·sec. Allowing the thermoplastic cellulose acetate propionate composition to have such a higher melt viscosity prevents the composition from being stretched under tension at the die outlet, thereby preventing the optical anisotropy (retardation) caused by stretch orientation from increasing. Such viscosity adjustment can be performed by any means. For example, the adjustment can be performed by adjusting the polymerization degree of cellulose acylate or the amount of an additive such as a plasticizer.

(6) Pelletization

Preferably, the above described cellulose acylate and additives are mixed and pelletized prior to melt film formation.

In pelletization, it is preferable to dry the cellulose acylate and additives in advance; however, if a vented extruder is used, the drying step can be omitted. When drying is performed, a drying method can be employed in which the cellulose acylate and additives are heated in a heating oven at 90° C. for 8 hours or more, though drying methods applicable in the present invention are not limited to this. Pelletization can be performed in such a manner that after melting the above described cellulose acylate and additives at temperatures of 150° C. or higher and 250° C. or lower on a twin-screw kneading extruder, the molten mixture is extruded in the form of noodles, and the noodle-shaped mixture is solidified in water, followed by cutting. Pelletization may also be performed by underwater cutting in which the above described cellulose acylate and additives are melted on an extruder and extruded through a ferrule directly in water, and cutting is performed in water while carrying out extrusion.

Any known extruder, such as single screw extruder, non-intermeshing counter-rotating twin-screw extruder, intermeshing counter-rotating twin-screw extruder, intermeshing corotating twin-screw extruder, can be used, as long as it enables melt kneading.

Preferably, the pellet size is such that the cross section is 1 mm$^2$ or larger and 300 mm$^2$ or smaller and the length is 1 mm or longer and 30 mm or shorter and more preferably the cross section is 2 mm$^2$ or larger and 100 mm$^2$ or smaller and the length is 1.5 mm or longer and 10 mm or shorter.

In pelletization, the above described additives may be fed through a raw material feeding opening or a vent located midway along the extruder.

The number of revolutions of the extruder is preferably 10 rpm or more and 1000 rpm or less, more preferably 20 rpm or more and 700 rpm or less, and much more preferably 30 rpm or more and 500 rpm or less. If the rotational speed is lower than the above described range, the residence time of the cellulose acylate and additives is increased, which undesirably causes heat deterioration of the mixture, and hence decrease in molecular weight and increase in color change to yellow. Further, if the rotational speed is higher than the above described range, molecule breakage by shear is more likely to occur, which gives rise to problems of decrease in molecular weight and increase in crosslinked gel.

The extrusion residence time in pelletization is preferably 10 seconds or longer and 30 minutes or shorter, more preferably 15 seconds or longer and 10 minutes or shorter, and much more preferably 30 seconds or longer and 3 minutes or shorter. As long as the resin mixture is sufficiently melt, shorter residence time is preferable, because shorter residence time enables the deterioration of resin or occurrence of yellowish color to be suppressed.

(7) Melt Film Formation (i) Drying

The cellulose acylate mixture palletized by the above described method is preferably used for the melt film formation, and the water content in the pellets is preferably decreased prior to the film formation.

In the present invention, to adjust the water content in the cellulose acylate to a desirable amount, it is preferable to dry the cellulose acylate. Drying is often carried out using an air dehumidification drier, but the method of drying is not limited to any specific one, as long as an intended water content is obtained (preferably drying is carried out efficiently by either any one of methods, such as heating, air blasting, pressure reduction and stirring, or two or more of them in combination, and more preferably a drying hopper having an insulating structure is used). The drying temperature is preferably 0 to 200° C., more preferably 40 to 180° C., and particularly preferably 60 to 150° C. Too low a drying temperature is not preferable, because if the drying temperature is too low, drying takes a longer time, and moreover, water content cannot be decreased to an intended value or lower. Too high a drying temperature is not preferable, either, because if the drying temperature is too high, the resin is adhere to cause blocking. The amount of drying air used is preferably 20 to 400 m³/hour, more preferably 50 to 300 m³/hour, and particularly preferably 100 to 250 m³/hour. Too small an amount of drying air is not preferable, because if the amount of drying air is too small, drying cannot be carried out efficiently. On the other hand, using too large an amount of drying air is not economical. This is because the drying effect cannot be drastically improved further even by using excess amount of drying air. The dew point of the air is preferably 0 to −60° C., more preferably −10 to −50° C., and particularly preferably −20 to −40° C. The drying time is required to be at least 15 minutes or longer, preferably 1 hour or longer and more preferably 2 hours or longer. However, the drying time exceeding 50 hours dose not drastically decrease the water content further and it might cause deterioration of the resin by heat. Thus, an unnecessarily long drying time is not preferable. In the cellulose acylate of the present invention, the water content is preferably 1.0% by mass or lower, more preferably 0.1% by mass or lower, and particularly preferably 0.01% by mass or lower.

(ii) Melt Extrusion

The above described cellulose acylate resin is fed into a cylinder via the feed opening of an extruder (different from the extruder used for the above described pelletization). The inside of the cylinder consists of: a feeding section where the cellulose acylate resin fed through the feed opening is transported in a fixed amount (area A); a compressing section where the cellulose acylate resin is melt-kneaded and compressed (area B); and a measuring section where the melt-kneaded and compressed cellulose acylate resin is measured (area C), from the feed opening side in this order. The resin is preferably dried by the above described method so as to decrease the water content; however, to prevent the molten resin from being oxidized by the remaining oxygen, more preferably extrusion is performed in a stream of inert gas (nitrogen etc.) or using a vented extruder while performing vacuum evacuation. The screw compression ratio of the extruder is set to 2.5 to 4.5 and the L/D to 20 to 70. The term "screw compression ratio" used herein means the volume ratio of the feeding section A to the measuring section C, in other words, the volume per unit length of the feeding section A÷ the volume per unit length of the measuring section C, which is calculated using the outside diameter d1 of the screw shaft of the feeding section A, the outside diameter d2 of the screw shaft of the measuring section C, the diameter a1 of the channel of the feeding section A, and the diameter a2 of the channel of the measuring section C. The "L/D" means the ratio of the cylinder length to the cylinder inside diameter. The extrusion temperature is set to 190 to 240° C. When the temperature inside of the extruder exceeds 240° C., a cooling machine should be provided between the extruder and the die.

If the screw compression ratio is as small as less than 2.5, melt-kneading is not sufficiently performed, causing an unmolten part, or the magnitude of heat evolution by shear stress is too small to sufficiently fuse crystals, making fine crystals more likely to remain in the formed cellulose acylate film. Furthermore, the cellulose acylate film more likely contains air bubbles. As a result, the cellulose acylate film having decreased strength is produced, or in stretching of the cellulose acylate film, the remaining crystals inhibit the stretchability of the film, whereby the degree of film orientation cannot be sufficiently increased. Conversely, if the screw compression ratio is as high as more than 4.5, the magnitude of heat evolution by shear stress is so large that the resin becomes more likely to deteriorate, which makes the cellulose acylate film more likely to yellow. Further, too large shear stress causes molecule breakage, which results in decrease in molecular weight, and hence in mechanical strength of the film. Accordingly, to make the formed cellulose acylate film less likely to be yellow and less likely to break in stretching, the screw compression ratio is preferably in the range of 2.5 to 4.5, more preferably in the range of 2.8 to 4.2, and particularly preferably in the range of 3.0 to 4.0.

The L/D as low as less than 20 causes insufficient melting or insufficient kneading, which makes fine crystals more likely to remain in the formed cellulose acylate film, like the case where the compression ratio is too low. Conversely, the L/D as high as more than 70 makes too long the residence time of the cellulose acylate resin in the extruder, which makes the resin more likely to deteriorate. Too long a residence time may cause molecule breakage, which results in decrease in molecular weight, and hence in mechanical strength of the film. Accordingly, to make the formed cellulose acylate film less likely to be yellow and less likely to break in stretching, the L/D is preferably in the range of 20 to 70, more preferably in the range of 22 to 65, and particularly preferably in the range of 24 to 50.

The extrusion temperature is preferably set in the above described temperature range. The cellulose acylate film thus obtained has the following characteristics: a haze of 2.0% or less; and a yellow index (YI value) of 10 or less.

The haze herein used is an index of whether the extrusion temperature is too low or not, in other words, an index of the amount of the crystals remaining in the formed cellulose acylate film. When the haze is more than 2.0%, the strength of the formed cellulose acylate film is likely to deteriorate and the breakage of the film is likely to occur. On the other hand, the yellow index (YI value) is an index of whether the extrusion temperature is too high or not. When the yellow index (YI value) is 10 or less, the formed cellulose acylate film is free from the problem of yellowing.

As extruder, generally single-screw extruder, which requires lower equipment costs, is often used. Types of single-screw extruder include: for example, fullflight-type, Madock-type and Dulmage-type. For the cellulose acylate resin, which is relatively poor in heat stability, fullflight-type screw extruder is preferably used. Twin-screw extruder which is provided with a vent midway along its length, and therefore, makes it possible to perform extrusion while removing unnecessary volatile components can also be used by changing the screw segment, though it requires high equipment costs. Types of twin-screw extruder include: broadly, corotating type and counter-rotating type, and either of the types can be used. However, preferably used is a corotating type of twin-screw extruder which causes less residence of the resin and has a high self-cleaning performance. Twin-screw extruder is suitable for the film formation of cellulose acylate resin, because it makes possible extrusion at low temperatures due to its high kneading performance and high resin-feeding performance, though its equipment costs are high. In twin-extruder, if a vent opening is properly arranged, pellets or powder of cellulose acylate can be used in the undried state or the selvedges of the film produced in the course of the film formation can also be reused in the undried state.

The preferable diameter of the screw varies depending on the intended amount of the cellulose acylate resin extruded per unit time; however, it is preferably 10 mm or larger and 300 mm or smaller, more preferably 20 mm or larger and 250 mm or smaller, and much more preferably 30 mm or larger and 150 mm or smaller.

(iii) Filtration

To filter contaminants in the resin or avoid the damage to the gear pump caused by such contaminants, it is preferable to perform a so-called breaker-plate-type filtration which uses a filter medium provided at the extruder outlet. To filter contaminants with much higher precision, it is preferable to provide, after the gear pump, a filter in which a leaf-type disc filter is incorporated. Filtration can be performed with a single filtering section, or it can be multi-step filtration with a plurality of filtering sections. A filter medium with higher precision is preferably used; however, taking into consideration the pressure resistance of the filter medium or the increase in filtration pressure due to the clogging of the filter medium, the filtration precision is preferably 15 μm to 3 μm and more preferably 10 μm to 3 μm. A filter medium with higher precision is particularly preferably used when a leaf-type disc filter is used to perform final filtration of contaminants. And in order to ensure suitability of the filter medium used, the filtration precision may be adjusted by the number of filter media loaded, taking into account the pressure resistance and filter life. From the viewpoint of being used at high temperature and high pressure, the type of the filter medium used is preferably a steel material. Of the steel materials, stainless steel or steel is particularly preferably used. From the viewpoint of corrosion, desirably stainless steel is used. A filter medium constructed by weaving wires or a sintered filter medium constructed by sintering, for example, metal long fibers or metal powder can be used. However, from the viewpoint of filtration precision and filter life, a sintered filter medium is preferably used.

(iv) Gear Pump

To improve the thickness precision, it is important to decrease the fluctuation in the amount of the discharged resin and it is effective to provide a gear pump between the extruder and the die to feed a fixed amount of cellulose acylate resin through the gear pump. A gear pump is such that it includes a pair of gears—a drive gear and a driven gear—in mesh, and it drives the drive gear to rotate both the gears in mesh, thereby sucking the molten resin into the cavity through the suction opening formed on the housing and discharging a fixed amount of the resin through the discharge opening formed on the same housing. Even if there is a slight change in the resin pressure at the tip of the extruder, the gear pump absorbs the change, whereby the change in the resin pressure in the downstream portion of the film forming apparatus is kept very small, and the fluctuation in the film thickness is improved. The use of a gear pump makes it possible to keep the fluctuation of the resin pressure at the die within the range of ±1%.

To improve the fixed-amount feeding performance of the gear pump, a method can also be used in which the pressure before the gear pump is controlled to be constant by varying the number of revolution of the screw. Or the use of a high-precision gear pump is also effective in which three or more gears are used to eliminate the fluctuation in gear of a gear pump.

Other advantages of using a gear pump are such that it makes possible the film formation while reducing the pressure at the tip of the screw, which would be expected to reduce the energy consumption, prevent the increase in resin temperature, improve the transportation efficiency, decrease in the residence time of the resin in the extruder, and decrease the L/D of the extruder. Furthermore, when a filter is used to remove contaminants, if a gear pump is not used, the amount of the resin fed from the screw can sometimes vary with increase in filtration pressure. However, this variation in the amount of resin fed from the screw can be eliminated by using a gear pump. On the other hand, disadvantages of using a gear pump are such that: it may increase the length of the equipment used, depending on the selection of equipment, which results in a longer residence time of the resin in the equipment; and the shear stress generated at the gear pump portion may cause the breakage of molecule chains. Thus, care must be taken when using a gear pump.

Preferably, the residence time of the resin, from the time the resin enters the extruder through the feed opening to the time it goes out of the die, is 2 minutes or longer and 60 minutes or shorter, more preferably 3 minutes or longer and 40 minutes or shorter, and much more preferably 4 minutes or longer and 30 minutes or shorter.

If the flow of polymer circulating around the bearing of the gear pump is not smooth, the seal by the polymer at the driving portion and the bearing portion becomes poor, which may cause the problem of producing wide fluctuations in measurements and feeding and extruding pressures. Thus, the gear pump (particularly clearances thereof) should be designed to match to the melt viscosity of the cellulose acylate resin. In some cases, the portion of the gear pump where the cellulose acylate resin resides can be a cause of the resin's deterioration. Thus, preferably the gear pump has a structure which allows the residence time of the cellulose acylate resin to be as short as possible. The polymer tubes or adaptors that connect the extruder with a gear pump or a gear pump with the die should be so designed that they allow the residence time of the cellulose acylate resin to be as short as possible. Furthermore, to stabilize the extrusion pressure of the cellulose acylate whose melt viscosity is highly temperature-dependent, preferably the fluctuation in temperature is kept as narrow as possible. Generally, a band heater, which requires lower equipment costs, is often used for heating polymer tubes; however, it is more preferable to use a cast-in aluminum heater which is less susceptible to temperature fluctuation. In order to make the discharge pressure in the extruder constant, it is preferable to heat a barrel of the extruder with a heater having 3 to 20 divided areas to melt the resin.

(v) Die

With the extruder constructed as above, the cellulose acylate is melted and continuously fed into a die, if necessary, through a filter or gear pump. Any type of commonly used die, such as T-die, fish-tail die or hanger coat die, may be used, as long as it allows the residence time of the molten resin to be short. Further, a static mixer can be introduced right before the T-die to increase the temperature uniformity. The clearance at the outlet of the T-die can be 1.0 to 5.0 times the film thickness, preferably 1.2 to 3 times the film thickness, and more preferably 1.3 to 2 times the film thickness. If the lip clearance is less than 1.0 time the film thickness, it is difficult to obtain a sheet whose surface state is good. Conversely, if the lip clearance is more than 5.0 times the film thickness, undesirably the thickness precision of the sheet is decreased. A die is very important equipment which determines the thickness precision of the film to be formed, and thus, one that can severely control the film thickness is preferably used. Although commonly used dies can control the film thickness at intervals of 40 to 50 mm, dies of a type which can control the film thickness at intervals of 35 mm or less and more preferably at intervals of 25 mm or less are preferable. In the cellulose acylate resin, since its melt viscosity is highly temperature-dependent and shear-rate-dependent, it is important to design a die that causes the least possible temperature uniformity and the least possible flow-rate uniformity across the width. The use of an automated thickness adjusting die, which measures the thickness of the film downstream, calculates the thickness deviation and feeds the calculated result back to the thickness adjustment, is also effective in decreasing fluctuations in thickness in the long-term continuous production of the cellulose acylate film.

In producing films, a single-layer film forming apparatus, which requires lower producing costs, is generally used. However, depending on the situation, it is also possible to use a multi-layer film forming apparatus to produce a film having 2 types or more of structure, in which an outer layer is formed as a functional layer. Generally, preferably a functional layer is laminated thin on the surface of the cellulose acylate film, but the layer-layer ratio is not limited to any specific one.

(vi) Cast

The molten resin extruded in the form of a sheet from the die in the above described manner is cooled and solidified on cooling drums to obtain a film. In this cooling and solidifying operation, preferably the adhesion of the extruded sheet of the molten resin to the cooling drums is enhanced by any of the methods, such as electrostatic application method, air-knife method, air-chamber method, vacuum-nozzle method or touch-roll method. These adhesion enhancing methods may be applied to either the whole surface or part of the surface of the sheet resulting from melt extrusion. A method, called as edge pinning, in which cooling drums are adhered to the edges of the film alone is often employed, but the adhesion enhancing method used in the present invention is not limited to this method.

Preferably, the molten resin sheet is cooled little by little using a plurality of cooling drums. Generally, such cooling is often performed using 3 cooling drums, but the number of cooling drums used is not limited to 3. The diameter of the cooling drums is preferably 100 mm or larger and 1000 mm or smaller and more preferably 150 mm or larger and 1000 mm or smaller. The spacing between the two adjacent drums of the plurality of drums is preferably 1 mm or larger and 50 mm or smaller and more preferably 1 mm or larger and 30 mm or smaller, in terms of face-face spacing.

The temperature of cooling drums is preferably 60° C. or higher and 160° C. or lower, more preferably 70° C. or higher and 150° C. or lower, and much more preferably 80° C. or higher and 140° C. or lower. The cooled and solidified sheet is then stripped off from the cooling drums, passed through take-off rollers (a pair of nip rollers), and wound up. The wind-up speed is preferably 10 m/min or higher and 100 m/min or lower, more preferably 15 m/min or higher and 80 m/min or lower, and much more preferably 20 m/min or higher and 70 m/min or lower.

The width of the film thus formed is preferably 0.7 m or more and 5 m or less, more preferably 1 m or more and 4 m or less, and much more preferably 1.3 m or more and 3 m or less. The thickness of the unstretched film thus obtained is preferably 30 μm or more and 400 μm or less, more preferably 40 μm or more and 300 μm or less, and much more preferably 50 μm or more and 200 μm or less.

When so-called touch roll method is used, the surface of the touch roll used may be made of resin, such as rubber or Teflon, or metal. A roll, called as flexible roll, can also be used whose surface gets a little depressed by the pressure of a metal roll having a decreased thickness when the flexible roll and the metal roll touch with each other, and their pressure contact area is increased.

The temperature of the touch roll is preferably 60° C. or higher and 160° C. or lower, more preferably 70° C. or higher and 150° C. or lower, and much more preferably 80° C. or higher and 140° C. or lower.

(vii) Winding Up

Preferably, the sheet thus obtained is wound up with its edges trimmed away. The portions having been trimmed off may be reused as a raw material for the same kind of film or a different kind of film, after undergoing grinding or after undergoing granulation, or depolymerization or re-polymerization depending on the situation. Any type of trimming cutter, such as a rotary cutter, shearing blade or knife, may be used. The material of the cutter may be either carbon steel or stainless steel. Generally, a carbide-tipped blade or ceramic blade is preferably used, because use of such a blade makes the life of a cutter longer and suppresses the production of cuttings.

It is also preferable, from the viewpoint of preventing the occurrence of scratches on the sheet, to provide, prior to winding up, a laminating film at least on one side of the sheet. Preferably, the wind-up tension is 1 kg/m (in width) or higher and 50 kg/m (in width) or lower, more preferably 2 kg/m (in width) or higher and 40 kg/m (in width) or lower, and much more preferably 3 kg/m (in width) or higher and 20 kg/m (in width) or lower. If the wind-up tension is lower than 1 kg/m (in width), it is difficult to wind up the film uniformly. Conversely, if the wind-up tension is higher than 50 kg/m (in width), undesirably the film is too tightly wound, whereby the appearance of wound film deteriorates, and the knot portion of the film is stretched due to the creep phenomenon, causing surging in the film, or residual double refraction occurs due to the extension of the film. Preferably, the winding up is performed while detecting the wind-up tension with a tension control provided midway along the line and controlling the same to be constant. When there is a difference in the film temperature depending on the spot on the film forming line, a slight difference in the film length can sometimes be created due to thermal expansion, and thus, it is necessary to adjust the draw ratio of the nip rolls so that tension higher than a prescribed one should not be applied to the film.

Preferably, the winding up of the film is performed while tapering the amount of the film to be wound according to the winding diameter so that a proper wind-up tension is kept, though it can be performed while keeping the wind-up tension constant by the control with the tension control. Generally, the wind-up tension is decreased little by little with increase in the winding diameter; however, it can sometimes be preferable to increase the wind-up tension with increase in the winding diameter.

(viii) Physical Properties of Unstretched Cellulose Acylate Film

In the unstretched cellulose acylate film thus obtained, preferably Re=0 to 20 nm and Rth=0 to 80 nm, more preferably Re=0 to 15 nm and Rth=0 to 70 nm, and much more preferably Re=0 to 10 nm and Rth=0 to 60 nm. Re and Rth represent in-plane retardation and across-the-thickness retardation, respectively. Re is measured using KOBRA 21ADH (manufactured by Oji Scientific Instruments) while allowing light to enter the unstretched cellulose acylate film normal to its surface. Rth is calculated based on three retardation measurements: the Re measured as above, and the Rth measured while allowing light to enter the film from the direction inclined at angles of +40°, −40', respectively, to the direction normal to the film using the slow axis in plane as a tilt axis (rotational axis). Preferably, the angle θ between the direction of the film formation (across the length) and the slow axis of the Re of the film is made as close to 0°, +90° or −90° as possible.

The total light transmittance is preferably 90% to 100%, more preferably 91% to 99%, and much more preferably 92% to 98%. Preferably, the haze is 0 to 1%, more preferably 0 to 0.8% and much more preferably 0 to 0.6%.

Preferably, the thickness non-uniformity both in the longitudinal direction and the transverse direction is 0% or more and 4% or less, more preferably 0% or more and 3% or less, and much more preferably 0% or more and 2% or less.

Preferably, the modulus in tension is 1.5 kN/mm² or more and 3.5 kN/mm² or less, more preferably 1.7 kN/mm² or more and 2.8 kN/mm² or less, and much more preferably 1.8 kN/mm² or more and 2.6 kN/mm² or less.

Preferably, the breaking extension is 3% or more and 100% or less, more preferably 5% or more and 80% or less, and much more preferably 8% or more and 50% or less.

Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower.

Preferably, the dimensional change by heat at 80° C. per day is 0% or higher ±1% or less both in the longitudinal direction and the transverse direction, more preferably 0% or higher ±0.5% or less, and much more preferably 0% or higher ±0.3% or less.

Preferably, the water permeability at 40° C., 90% rh is 300 g/m²·day or higher and 1000 g/m²·day or lower, more preferably 400 g/m²·day or higher and 900 g/m²·day or lower, and much more preferably 500 g/m²·day or higher and 800 g/m²·day or lower.

Preferably, the average water content at 25° C., 80% rh is 1% by weight or higher and 4% by weight or lower, more preferably 1.2% by weight or higher and 3% by weight or lower, and much more preferably 1.5% by weight or higher and 2.5% by weight or lower.

(8) Stretching

The film formed by the above described process may be stretched. The Re and Rth of the film can be controlled by stretching.

Preferably, stretching is carried out at temperatures of Tg or higher and Tg+50° C. or lower, more preferably at temperatures of Tg+3° C. or higher and Tg+30° C. or lower, and much more preferably at temperatures of Tg+5° C. or higher and Tg+20° C. or lower. Preferably, the stretch magnification is 1% or higher and 300% or lower at least in one direction, more preferably 2% or higher and 250% or lower, and much more preferably 3% or higher and 200% or lower. The stretching can be performed equally in both longitudinal and transverse directions; however, preferably it is performed unequally so that the stretch magnification in one direction is larger than that of the other direction. Either the stretch magnification in the longitudinal direction (MD) or that in the transverse direction (TD) may be made larger. Preferably, the smaller value of the stretch magnification is 1% or more and 30% or less, more preferably 2% or more and 25% or less, and much more preferably 3% or more and 20% or less. Preferably, the larger one is 30% or more and 300% or less, more preferably 35% or more and 200% or less, and much more preferably 40% or more and 150% or less. The stretching operation can be carried out in one step or in a plurality of steps. The term "stretch magnification" used herein means the value obtained using the following equation.

Stretch magnification (%)=100×{(length after stretching)−(length before stretching)}/(length before stretching)

The stretching may be performed in the longitudinal direction by using 2 or more pairs of nip rolls and controlling the peripheral velocity of the pairs of nip rolls so that the velocity of the pair on the outlet side is faster than that of the other one(s) (longitudinal stretching) or in the transverse direction (in the direction perpendicular to the longitudinal direction) while allowing both ends of the film to be gripped by a chuck (transverse stretching). Further, the stretching may be performed using the simultaneous biaxial stretching method described in Japanese Patent Application Laid-Open Nos. 2000-37772, 2001-113591 and 2002-103445.

In the longitudinal stretching, the Re-to-Rth ratio can be freely controlled by controlling the value obtained by dividing the distance between two pairs of nip rolls by the width of the film (length-to-width ratio). In other words, the ratio Rth/Re can be increased by decreasing the length-to-width ratio. Further, Re and Rth can also be controlled by combining the longitudinal stretching and the transverse stretching. In other words, Re can be decreased by decreasing the difference between the percent of longitudinal stretch and the percent of the transverse stretch, while Re can be increased by increasing the difference between the same.

Preferably, the Re and Rth of the cellulose acylate film thus stretched satisfy the following formulas, $Rth \geq Re$ $200 \geq Re \geq 0$ $500 \geq Rth \geq 30$, more preferably $Rth \geq Re \times 1.1$ $150 \geq Re \geq 10$ $400 \geq Rth \geq 50$, and much more preferably $Rth \geq Re \times 1.2$ $100 \geq Re \geq 20$ $350 \geq Rth \geq 80$.

Preferably, the angle θ between the film forming direction (longitudinal direction) and the slow axis of Re of the film is as close to 0°, +90° or −90° as possible. Specifically, in the longitudinal stretching, preferably the angle θ is as close to 0° as possible, and it is preferably 0±3°, more preferably 0±2° and much more preferably 0±1°. In the transverse stretching, the angle θ is preferably 90±3° or −90±3°, more preferably 90±2° or −90±2°, and much more preferably 90±1° or −90±1°.

Preferably, the thickness of the cellulose acylate film after stretching is 15 μm or more and 200 μm or less, more preferably 30 μm or more and 170 μm or less, and much more preferably 40 μm or more and 140 μm or less. Preferably, the thickness non-uniformity is 0% or more and 3% or less in both the longitudinal and transverse directions, more preferably 0% or more and 2% or less, and much more preferably 0% or more and 1% or less.

The physical properties of the stretched cellulose acylate film are preferably in the following range.

Preferably, the modulus in tension is 1.5 kN/mm² or more and less than 3.0 kN/mm², more preferably 1.7 kN/mm² or more and 2.8 kN/mm² or less, and much more preferably 1.8 kN/mm² or more and 2.6 kN/mm² or less.

Preferably, the breaking extension is 3% or more and 100% or less, more preferably 5% or more and 80% or less, and much more preferably 8% or more and 50% or less.

Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower.

Preferably, the dimensional change by heat at 80° C. per day is 0% or higher ±1% or less both in the longitudinal direction and the transverse direction, more preferably 0% or higher ±0.5% or less, and much more preferably 0% or higher ±0.3% or less.

Preferably, the water permeability at 40° C., 90% is 300 g/m$^2$·day or higher and 1000 g/m$^2$·day or lower, more preferably 400 g/m$^2$·day or higher and 900 g/m$^2$·day or lower, and much more preferably 500 g/m$^2$·day or higher and 800 g/m$^2$·day or lower.

Preferably, the average water content at 25° C., 80% rh is 1% by weight or higher and 4% by weight or lower, more preferably 1.2% by weight or higher and 3% by weight or lower, and much more preferably 1.5% by weight or higher and 2.5% by weight or lower.

The thickness is preferably 30 μm or more and 200 μm or less, more preferably 40 μm or more and 180 μm or less, and much more preferably 50 μm or more and 150 μm or less.

The haze is 0% or more and 3% or less, more preferably 0% or more and 2% or less, and much more preferably 0% or more and 1% or less.

The total light transmittance is preferably 90% or higher and 100% or lower, more preferably 91% or higher and 99% or lower, and much more preferably 92% or higher and 98% or lower.

(9) Surface Treatment

The adhesion of both unstretched and stretched cellulose acylate films to each functional layer (e.g. undercoat layer and back layer) can be improved by subjecting them to surface treatment. Examples of types of surface treatment applicable include: treatment using glow discharge, ultraviolet irradiation, corona discharge, flame, or acid or alkali. The glow discharge treatment mentioned herein may be treatment using low-temperature plasma generated in a low-pressure gas at 10$^{-3}$ to 20 Torr. Or plasma treatment at atmospheric pressure is also preferable. Plasma excitation gases are gases that undergo plasma excitation under the above described conditions, and examples of such gases include: argon, helium, neon, krypton, xenon, nitrogen, carbon dioxide, flons such as tetrafluoromethane, and the mixtures thereof. These are described in detail in Journal of Technical Disclosure (Laid-Open No. 2001-1745, issued on Mar. 15, 2001, by Japan Institute of Invention and Innovation), 30-32. In the plasma treatment at atmospheric pressure, which has attracted considerable attention in recent years, for example, irradiation energy of 20 to 500 Kgy is used at 10 to 1000 Kev, and preferably irradiation energy of 20 to 300 Kgy is used at 30 to 500 Kev. Of the above described types of treatment, most preferable is alkali saponification, which is extremely effective as surface treatment for cellulose acylate films. Specific examples of such treatment applicable include: those described in Japanese Patent Application Laid-Open Nos. 2003-3266, 2003-229299, 2004-322928 and 2005-76088.

Alkali saponification may be carried out by immersing the film in a saponifying solution or by coating the film with a saponifying solution. The saponification by immersion can be achieved by allowing the film to pass through a bath, in which an aqueous solution of NaOH or KOH with pH of 10 to 14 has been heated to 20° C. to 80° C., over 0.1 to 10 minutes, neutralizing the same, water-washing the neutralized film, followed by drying.

The saponification by coating can be carried out using a coating method such as dip coating, curtain coating, extrusion coating, bar coating or E-coating. A solvent for alkali-saponification solution is preferably selected from solvents that allow the saponifying solution to have excellent wetting characteristics when the solution is applied to a transparent substrate; and allow the surface of a transparent substrate to be kept in a good state without causing irregularities on the surface. Specifically, alcohol solvents are preferable, and isopropyl alcohol is particularly preferable. An aqueous solution of surfactant can also be used as a solvent. As an alkali for the alkali-saponification coating solution, an alkali soluble in the above described solvent is preferable, and KOH or NaOH is more preferable. The pH of the alkali-saponification coating solution is preferably 10 or more and more preferably 12 or more. Preferably, the alkali saponification reaction is carried at room temperature for 1 second or longer and 5 minutes or shorter, more preferably for 5 seconds or longer and 5 minutes or shorter, and particularly preferably for 20 seconds or longer and 3 minutes or shorter. It is preferable to wash the saponifying solution-coated surface with water or an acid and wash the surface with water again after the alkali saponification reaction. The coating-type saponification and the removal of orientation layer described later can be performed continuously, whereby the number of the producing steps can be decreased. The details of these saponifying processes are described in, for example, Japanese Patent Application Laid-Open No. 2002-82226 and WO 02/46809.

To improve the adhesion of the unstretched or stretched cellulose acylate film to each functional layer, it is preferable to provide an undercoat layer on the cellulose acylate film. The undercoat layer may be provided after carrying out the above described surface treatment or without the surface treatment. The details of the undercoat layers are described in Journal of Technical Disclosure (Laid-Open No. 2001-1745, issued on Mar. 15, 2001, by Japan Institute of Invention and Innovation), 32.

These surface-treatment step and under-coat step can be incorporated into the final part of the film forming step, or they can be performed independently, or they can be performed in the functional-layer providing process.

(10) Providing Functional Layer

Preferably, the stretched and unstretched cellulose acylate films of the present invention are combined with any one of the functional layers described in detail in Journal of Technical Disclosure (Laid-Open No. 2001-1745, issued on Mar. 15, 2001, by Japan Institute of Invention and Innovation), 32-45. Particularly preferable is providing a polarizing layer (polarizer), optical compensation layer (optical compensation film), antireflection layer (antireflection film) or hard coat layer.

(i) Providing Polarizing Layer (Preparation of Polarizer)

[Materials Used for Polarizing Layer]

At the present time, generally, commercially available polarizing layers are prepared by immersing stretched polymer in a solution of iodine or a dichroic dye in a bath so that the iodine or dichroic dye penetrates into the binder. Coating-type of polarizing films, represented by those manufactured by Optiva Inc. are also available as a polarizing film. Iodine or a dichroic dye in the polarizing film develops polarizing properties when its molecules are oriented in a binder. Examples of dichroic dyes applicable include: azo dye, stilbene dye, pyrazolone dye, triphenylmethane dye, quinoline dye, oxazine dye, thiazine dye and anthraquinone dye. The dichroic dye used is preferably water-soluble. The dichroic dye used preferably has a hydrophilic substitute (e.g. sulfo, amino, or hydroxyl). Example of such dichroic dyes includes:

compounds described in Journal of Technical Disclosure, Laid-Open No. 2001-1745, 58, (issued on Mar. 15, 2001, by Japan Institute of Invention and Innovation).

Any polymer which is crosslinkable in itself or which is crosslinkable in the presence of a crosslinking agent can be used as a binder for polarizing films. And more than one combination thereof can also be used as a binder. Examples of binders applicable include: compounds described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000. Details of denatured polyvinyl alcohol are described in Japanese Patent Application Laid-Open Nos. 8-338913, 9-152509 and 9-316127. For polyvinyl alcohol and denatured polyvinyl alcohol, two or more kinds may be used in combination.

Preferably, the minimum of the binder thickness is 10 μm. For the maximum of the binder thickness, from the viewpoint of light leakage of liquid crystal displays, preferably the binder has the smallest possible thickness. The thickness of the binder is preferably equal to or smaller than that of currently commercially available polarizer (about 30 μm), more preferably 25 μm or smaller, and much more preferably 20 μm or smaller.

The binder for polarizing films may be crosslinked. Polymer or monomer that has a crosslinkable functional group may be mixed into the binder. Or a crosslinkable functional group may be provided to the binder polymer itself. Crosslinking reaction is allowed to progress by means of light, heat or pH changes, and a binder having a crosslinked structure can be formed by crosslinking reaction. Examples of crosslinking agents applicable are described in U.S. Pat. (Reissued) No. 23,297. Boron compounds (e.g. boric acid and borax) may also be used as a crosslinking agent. The amount of the crosslinking agent added to the binder is preferably 0.1 to 20% by mass of the binder. This allows polarizing devices to have good orientation characteristics and polarizing films to have good damp heat resistance.

The amount of the unreacted crosslinking agent after completion of the crosslinking reaction is preferably 1.0% by mass or less and more preferably 0.5% by mass or less. Restraining the unreacted crosslinking agent to such an amount improves the weatherability of the binder.

[Stretching of Polarizing Film]

Preferably, a polarizing film is dyed with iodine or a dichroic dye after undergoing stretching (stretching process) or rubbing (rubbing process).

In the stretching process, preferably the stretching magnification is 2.5 to 30.0 and more preferably 3.0 to 10.0. Stretching can be dry stretching, which is performed in the air. Stretching can also be wet stretching, which is performed while immersing a film in water. The stretching magnification in the dry stretching is preferably 2.5 to 5.0, while the stretching magnification in the wet stretching is preferably 3.0 to 10.0. Stretching may be performed parallel to the MD direction (parallel stretching) or in an oblique (oblique stretching). These stretching operations may be performed at one time or in several installments. Stretching can be performed more uniformly even in high-ratio stretching if it is performed in several installments. Oblique stretching in which stretching is performed in an oblique while tilting a film at an angle of 10 degrees to 80 degrees is more preferable.

(1) Parallel Stretching Process

Prior to stretching, a PVA film is swelled. The degree of swelling is 1.2 to 2.0 (ratio of mass before swelling to mass after swelling). After this swelling operation, the PVA film is stretched in a water-based solvent bath or in a dye bath in which a dichroic substance is dissolved at a bath temperature of 15 to 50° C., preferably 17 to 40° C. while continuously conveying the film via a guide roll etc. Stretching can be accomplished in such a manner as to grip the PVA film with 2 pairs of nip rolls and control the conveying speed of nip rolls so that the conveying speed of the latter pair of nip rolls is higher than that of the former pair of nip rolls. The stretching magnification is based on the length of PVA film after stretching/the length of the same in the initial state ratio (hereinafter the same), and from the viewpoint of the above described advantages, the stretching magnification is preferably 1.2 to 3.5 and more preferably 1.5 to 3.0. After this stretching operation, the film is dried at 50° C. to 90° C. to obtain a polarizing film.

(II) Oblique Stretching Process

Oblique stretching can be performed by the method described in Japanese Patent Application Laid-Open No. 2002-86554 in which a tenter that projects on a tilt is used. This stretching is performed in the air; therefore, it is necessary to allow a film to contain water so that the film is easy to stretch. Preferably, the water content in the film is 5% or higher and 100% or lower, the stretching temperature is 40° C. or higher and 90° C. or lower, and the humidity during the stretching operation is preferably 50% rh or higher and 100% rh or lower.

The absorbing axis of the polarizing film thus obtained is preferably 10 degrees to 80 degrees, more preferably 30 degrees to 60 degrees, and much more preferably substantially 45 degrees (40 degrees to 50 degrees).

[Lamination]

The above described stretched and unstretched cellulose acylate films having undergone saponification and the polarizing layer prepared by stretching are laminated to prepare a polarizer. They may be laminated in any direction, but preferably they are laminated so that the angle between the direction of the film casting axis and the direction of the polarizer stretching axis is 0 degree, 45 degrees or 90 degrees.

Any adhesive can be used for the lamination. Examples of adhesives applicable include: PVA resins (including denatured PVA such as acetoacetyl, sulfonic, carboxyl or oxyalkylen group) and aqueous solutions of boron compounds. Of these adhesives, PVA resins are preferable. The thickness of the adhesive layer is preferably 0.01 to 10 μm and particularly preferably 0.05 to 5 μm, on a dried layer basis.

Examples of configurations of laminated layers are as follows:

a. A/P/A
b. A/P/B
c. A/P/T
d. B/P/B
e. B/P/F where A represents an unstretched film of the present invention, B a stretched film of the present invention, T a cellulose triacetate film (Fujitack), and P a polarizing layer. In the configurations a, b, A and B may be cellulose acetate having the same composition, or they may be different. In the configuration d, two Bs may be cellulose acetate having the same composition, or they may be different, and their stretching rates may be the same or different. When sheets of polarizer are used as an integral part of a liquid crystal display, they may be integrated into the display with either side of them facing the liquid crystal surface; however, in the configurations b, e, preferably B is allowed to face the liquid crystal surface.

In the liquid crystal displays into which sheets of polarizer are integrated, usually a substrate including liquid crystal is arranged between two sheets of polarizer; however, the sheets of polarizer of a to e of the present invention and commonly used polarizer (T/P/T) can be freely combined. On the outermost surface of a liquid crystal display, however, preferably a transparent hard coat layer, an anti-glare layer, antireflection layer and the like is provided, and as such a layer, any one of layers described later can be used.

Preferably, the sheets of polarizer thus obtained have a high light transmittance and a high degree of polarization. The light transmittance of the polarizer is preferably in the range of 30 to 50% at a wavelength of 550 nm, more preferably in the range of 35 to 50%, and most preferably in the range of 40 to 50%. The degree of polarization is preferably in the range of 90 to 100% at a wavelength of 550 nm, more preferably in the range of 95 to 100%, and most preferably in the range of 99 to 100%.

The sheets of polarizer thus obtained can be laminated with a $\lambda/4$ plate to create circularly polarized light. In this case, they are laminated so that the angle between the slow axis of the $\lambda/4$ plate and the absorbing axis of the polarizer is 45 degrees. Any $\lambda/4$ plate can be used to create circularly polarized light; however, preferably one having such wavelength-dependency that retardation is decreased with decrease in wavelength is used. More preferably, a polarizing film having an absorbing axis which tilts 20 degrees to 70 degrees in the longitudinal direction and a $\lambda/4$ plate that includes an optically anisotropic layer made up of a liquid crystalline compound are used.

These sheets of polarizer may include a protective film laminated on one side and a separate film on the other side. Both protective film and separate film are used for protecting sheets of polarizer at the time of their shipping, inspection and the like.

(ii) Providing Optical Compensation Layer (Preparation of Optical Compensation Film)

An optically anisotropic layer is used for compensating the liquid crystalline compound in a liquid crystal cell in black display by a liquid crystal display. It is prepared by forming an orientation film on each of the stretched and unstretched cellulose acylate films and providing an optically anisotropic layer on the orientation film.

[Orientation Film]

An orientation film is provided on the above described stretched and unstretched cellulose acylate films which have undergone surface treatment. This film has the function of specifying the orientation direction of liquid crystalline molecules. However, this film is not necessarily indispensable constituent of the present invention. This is because a liquid crystalline compound plays the role of the orientation film, as long as the oriented state of the liquid crystalline compound is fixed after it undergoes orientation treatment. In other words, the sheets of polarizer of the present invention can also be prepared by transferring only the optically anisotropic layer on the orientation film, where the orientation state is fixed, on the polarizer.

An orientation film can be provided using a technique such as rubbing of an organic compound (preferably polymer), oblique deposition of an inorganic compound, formation of a micro-groove-including layer, or built-up of an organic compound (e.g. ω-tricosanic acid, dioctadecyl methyl ammonium chloride, methyl stearate) by Langmur-Blodgett technique (LB membrane). Orientation films in which orientation function is produced by the application of electric field, electromagnetic field or light irradiation are also known.

Preferably, the orientation film is formed by rubbing of polymer. As a general rule, the polymer used for the orientation film has a molecular structure having the function of orienting liquid crystalline molecules.

In the present invention, preferably the orientation film has not only the function of orienting liquid crystalline molecules, but also the function of combining a side chain having a crosslinkable functional group (e.g. double bond) with the main chain or the function of introducing a crosslinkable functional group having the function of orienting liquid crystalline molecules into a side chain.

Either polymer which is crosslinkable in itself or polymer which is crosslinkable in the presence of a crosslinking agent can be used for the orientation film. And a plurality of the combinations thereof can also be used. Examples of such polymer include: those described in Japanese Patent Application Laid-Open No. 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate. Silane coupling agents can also be used as a polymer. Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol. Use of two kinds of polyvinyl alcohol or denatured polyvinyl alcohol having different polymerization degrees in combination is particularly preferable. The saponification degree of polyvinyl alcohol is preferably 70 to 100% and more preferably 80 to 100%. The polymerization degree of polyvinyl alcohol is preferably 100 to 5000.

Side chains having the function of orienting liquid crystal molecules generally have a hydrophobic group as a functional group. The kind of the functional group is determined depending on the kind of liquid crystalline molecules and the oriented state required. For example, a denatured group of denatured polyvinyl alcohol can be introduced by copolymerization denaturation, chain transfer denaturation or block polymerization denaturation. Examples of denatured groups include: hydrophilic groups (e.g. carboxylic, sulfonic, phosphonic, amino, ammonium, amide and thiol groups); hydrocarbon groups with 10 to 100 carbon atoms; fluorine-substituted hydrocarbon groups; thioether groups; polymerizable groups (e.g. unsaturated polymerizable groups, epoxy group, azirinyl group); and alkoxysilyl groups (e.g. trialkoxy, dialkoxy, monoalkoxy). Specific examples of these denatured polyvinyl alcohol compounds include: those described in Japanese Patent Application Laid-Open No. 2000-155216, columns [0022] to [0145], Japanese Patent Application Laid-Open No. 2002-62426, columns [0018] to [0022].

Combining a side chain having a crosslinkable functional group with the main chain of the polymer of an orientation film or introducing a crosslinkable functional group into a side chain having the function of orienting liquid crystal molecules makes it possible to copolymerize the polymer of the orientation film and the polyfunctional monomer contained in the optically anisotropic layer. As a result, not only the molecules of the polyfunctional monomer, but also the molecules of the polymer of the orientation film and those of the polyfunctional monomer and the polymer of the orientation film are covalently firmly bonded together. Thus, introduction of a crosslinkable functional group into the polymer of an orientation film enables remarkable improvement in the strength of optical compensation films.

The crosslinkable functional group of the polymer of the orientation film preferably has a polymerizable group, like the polyfunctional monomer. Specific examples of such crosslinkable functional groups include: those described in Japanese Patent Application Laid-Open No. 2000-155216, columns [0080] to [0100]. The polymer of the orientation film can be crosslinked using a crosslinking agent, besides the above described crosslinkable functional groups.

Examples of crosslinking agents applicable include: aldehyde; N-methylol compounds; dioxane derivatives; compounds that function by the activation of their carboxyl group; activated vinyl compounds; activated halogen compounds; isoxazol; and dialdehyde starch. Two or more kinds of crosslinking agents may be used in combination. Specific examples of such crosslinking agents include: compounds described in Japanese Patent Application Laid-Open No. 2002-62426, columns [0023] to [0024]. Aldehyde, which is highly reactive, particularly glutaraldehyde is preferably used as a crosslinking agent.

The amount of the crosslinking agent added is preferably 0.1 to 20% by mass of the polymer and more preferably 0.5 to 15% by mass. The amount of the unreacted crosslinking agent remaining in the orientation film is preferably 1.0% by mass or less and more preferably 0.5% by mass or less. Controlling the amount of the crosslinking agent and unreacted crosslinking agent in the above described manner makes it possible to obtain a sufficiently durable orientation film, in which reticulation does not occur even after it is used in a liquid crystal display for a long time or it is left in an atmosphere of high temperature and high humidity for a long time.

Basically, an orientation film can be formed by: coating the above described polymer, as a material for forming an orientation film, on a transparent substrate containing a crosslinking agent; heat drying (crosslinking) the polymer; and rubbing the same. The crosslinking reaction may be carried out at any time after the polymer is applied to the transparent substrate, as described above. When a water-soluble polymer, such as polyvinyl alcohol, is used as the material for forming an orientation film, the coating solution is preferably a mixed solvent of an organic solvent having an anti-foaming function (e.g. methanol) and water. The mixing ratio is preferably such that water:methanol=0:100 to 99:1 and more preferably 0:100 to 91:9. The use of such a mixed solvent suppresses the generation of foam, thereby significantly decreasing defects not only in the orientation film, but also on the surface of the optically anisotropic layer.

As a coating method for coating an orientation film, spin coating, dip coating, curtain coating, extrusion coating, rod coating or roll coating is preferably used. Particularly preferably used is rod coating. The thickness of the film after drying is preferably 0.1 to 10 μm. The heat drying can be carried out at 20° C. to 110° C. To achieve sufficient crosslinking, preferably the heat drying is carried out at 60° C. to 100° C. and particularly preferably at 80° C. to 100° C. The drying time can be 1 minute to 36 hours, but preferably it is 1 minute to 30 minutes. Preferably, the pH of the coating solution is set to a value optimal to the crosslinking agent used. When glutaraldehyde is used, the pH is 4.5 to 5.5 and particularly preferably 5.

The orientation film is provided on the stretched and unstretched cellulose acylate films or on the above described undercoat layer. The orientation film can be obtained by crosslinking the polymer layer and providing rubbing treatment on the surface of the polymer layer, as described above.

The above described rubbing treatment can be carried out using a treatment method widely used in the treatment of liquid crystal orientation in LCD. Specifically, orientation can be obtained by rubbing the surface of the orientation film in a fixed direction with paper, gauze, felt, rubber or nylon, polyester fiber and the like. Generally the treatment is carried out by repeating rubbing a several times using a cloth in which fibers of uniform length and diameter have been uniformly transplanted.

In the rubbing treatment industrially carried out, rubbing is performed by bringing a rotating rubbing roll into contact with a running film including a polarizing layer. The circularity, cylindricity and deviation (eccentricity) of the rubbing roll are preferably 30 μm or less respectively. The wrap angle of the film wrapping around the rubbing roll is preferably 0.1 to 90°. However, as described in Japanese Patent Application Laid-Open No. 8-160430, if the film is wrapped around the rubbing roll at 360° or more, stable rubbing treatment is ensured. The conveying speed of the film is preferably 1 to 100 m/min. Preferably, the rubbing angle is properly selected from the range of 0 to 60°. When the orientation film is used in liquid crystal displays, the rubbing angle is preferably 40° to 50° and particularly preferably 45°.

The thickness of the orientation film thus obtained is preferably in the range of 0.1 to 10 μm.

Then, liquid crystalline molecules of the optically anisotropic layer are oriented on the orientation film. After that, if necessary, the polymer of the orientation film and the polyfunctional monomer contained in the optically anisotropic layer are reacted, or the polymer of the orientation film is crosslinked using a crosslinking agent.

The liquid crystalline molecules used for the optically anisotropic layer include: rod-shaped liquid crystalline molecules and discotic liquid crystalline molecules. The rod-shaped liquid crystalline molecules and discotic liquid crystalline molecules may be either high-molecular-weight liquid crystalline molecules or low-molecular-weight liquid crystalline molecules, and they include low-molecule liquid crystalline molecules which have undergone crosslinking and do not show liquid crystallinity any more.

[Rod-Shaped Liquid Crystalline Molecules]

Examples of rod-shaped liquid crystalline molecules preferably used include: azomethines, azoxys, cyanobiphenyls, cyanophenyl esters, benzoate esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles.

Rod-shaped liquid crystalline molecules also include metal complexes. Liquid crystal polymer that includes rod-shaped liquid crystalline molecules in its repeating unit can also be used as rod-shaped liquid crystalline molecules. In other words, rod-shaped liquid crystalline molecules may be bonded to (liquid crystal) polymer.

Rod-shaped liquid crystalline molecules are described in Kikan Kagaku Sosetsu (Survey of Chemistry, Quarterly), Vol. 22, Chemistry of Liquid Crystal (1994), edited by The Chemical Society of Japan, Chapters 4, 7 and 11 and in Handbook of Liquid Crystal Devices, edited by 142th Committee of Japan Society for the Promotion of Science, Chapter 3.

The index of birefringence of the rod-shaped crystalline molecules is preferably in the range of 0.001 to 0.7. To allow the oriented state to be fixed, preferably the rod-shaped liquid crystalline molecules have a polymerizable group. As such a polymerizable group, a radically polymerizable unsaturated group or cationically polymerizable group is preferable. Specific examples of such polymerizable groups include: polymerizable groups and polymerizable liquid crystal compounds described in Japanese Patent Application Laid-Open No. 2002-62427, columns [0064] to [0086].
[Discotic Liquid Crystalline Molecules]

Discotic liquid crystalline molecules include: benzene derivatives described in the research report by C. Destrade et al., Mol. Cryst. Vol. 71, 111 (1981); truxene derivatives described in the research report by C. Destrade et al., Mol. Cryst. Vol. 122, 141 (1985) and Physics lett, A, Vol. 78, 82 (1990); cyclohexane derivatives described in the research report by B. Kohne et al., Angew. Chem. Vol. 96, 70 (1984); and azacrown or phenylacetylene macrocycles described in the research report by J. M. Lehn et al., J. Chem. Commun., 1794 (1985) and in the research report by J. Zhang et al., L. Am. Chem. Soc. Vol. 116, 2655 (1994).

Discotic liquid crystalline molecules also include liquid crystalline compounds having a structure in which straight-chain alkyl group, alkoxy group and substituted benzoyloxy group are substituted radially as the side chains of the mother nucleus at the center of the molecules. Preferably, the compounds are such that their molecules or groups of molecules have rotational symmetry and they can provide an optically anisotropic layer with a fixed orientation. In the ultimate state of the optically anisotropic layer formed of discotic liquid crystalline molecules, the compounds contained in the optically anisotropic layer are not necessarily discotic liquid crystalline molecules. The ultimate state of the optically anisotropic layer also contain compounds such that they are originally of low-molecular-weight discotic liquid crystalline molecules having a group reactive with heat or light, but undergo polymerization or crosslinking by heat or light, thereby becoming higher-molecular-weight molecules and losing their liquid crystallinity. Examples of preferred discotic liquid crystalline molecules are described in Japanese Patent Application Laid-Open No. 8-50206. And the details of the polymerization of discotic liquid crystalline molecules are described in Japanese Patent Application Laid-Open No. 8-27284.

To fix the discotic liquid crystalline molecules by polymerization, it is necessary to bond a polymerizable group, as a substitute, to the discotic core of the discotic liquid crystalline molecules. Compounds in which their discotic core and a polymerizable group are bonded to each other via a linking group are preferably used. With such compounds, the oriented state is maintained during the polymerization reaction. Examples of such compounds include: those described in Japanese Patent Application Laid-Open No. 2000-155216, columns [0151] to [0168].

In hybrid orientation, the angle between the long axis (disc plane) of the discotic liquid crystalline molecules and the plane of the polarizing film increases or decreases, across the depth of the optically anisotropic layer, with increase in the distance from the plane of the polarizing film. Preferably, the angle decreases with increase in the distance. The possible changes in angle include: continuous increase, continuous decrease, intermittent increase, intermittent decrease, change including both continuous increase and continuous decrease, and intermittent change including increase and decrease. The intermittent changes include the area midway across the thickness where the tilt angle does not change. Even if the change includes the area where the angle does not change, it does not matter as long as the angle increases or decreased as a whole. Preferably, the angle changes continuously.

Generally, the average direction of the long axis of the discotic liquid crystalline molecules on the polarizing film side can be adjusted by selecting the type of discotic liquid crystalline molecules or the material for the orientation film, or by selecting the method of rubbing treatment. On the other hand, generally the direction of the long axis (disc plane) of the discotic liquid crystalline molecules on the surface side (on the air side) can be adjusted by selecting the type of discotic liquid crystalline molecules or the type of the additives used together with the discotic liquid crystalline molecules. Examples of additives used with the discotic liquid crystalline molecules include: plasticizer, surfactant, polymerizable monomer, and polymer. The degree of the change in orientation in the long axis direction can also be adjusted by selecting the type of the liquid crystalline molecules and that of additives, like the above described cases.
[Other Compositions of Optically Anisotropic Layer]

Use of plasticizer, surfactant, polymerizable monomer, etc. together with the above described liquid crystalline molecules makes it possible to improve the uniformity of the coating film, the strength of the film and the orientation of liquid crystalline molecules. Preferably, such additives are compatible with the liquid crystalline molecules, and they can change the tilt angle of the liquid crystalline molecules or do not inhibit the orientation of the liquid crystalline molecules.

Examples of polymerizable monomers applicable include radically polymerizable or cationically polymerizable compounds. Preferable are radically polymerizable polyfunctional monomers which are copolymerizable with the above described polymerizable-group containing liquid crystalline compounds. Specific examples are those described in Japanese Patent Application Laid-Open No. 2002-296423, columns [0018] to [0020]. The amount of the above described compounds added is generally in the range of 1 to 50% by mass of the discotic liquid crystalline molecules and preferably in the range of 5 to 30% by mass.

Examples of surfactants include traditionally known compounds; however, fluorine compounds are particularly preferable. Specific examples of fluorine compounds include compounds described in Japanese Patent Application Laid-Open No. 2001-330725, columns [0028] to [0056].

Preferably, polymers used together with the discotic liquid crystalline molecules can change the tilt angle of the discotic liquid crystalline molecules.

Examples of polymers applicable include cellulose esters. Examples of preferred cellulose esters include those described in Japanese. Patent Application Laid-Open No. 2000-155216, columns [0178]. Not to inhibit the orientation of the liquid crystalline molecules, the amount of the above described polymers added is preferably in the range of 0.1 to. 10% by mass of the liquid crystalline molecules and more preferably in the range of 0.1 to 8% by mass.

The discotic nematic liquid crystal phase-solid phase transition temperature of the discotic liquid crystalline molecules is preferably 70 to 300° C. and more preferably 70 to 170° C.
[Formation of Optically Anisotropic Layer]

An optically anisotropic layer can be formed by coating the surface of the orientation film with a coating fluid that contains liquid crystalline molecules and, if necessary, polymerization initiator or any other ingredients described later.

As a solvent used for preparing the coating fluid, an organic solvent is preferably used. Examples of organic solvents applicable include: amides (e.g. N,N-dimethylformamide); sulfoxides (e.g. dimethylsulfoxide); heterocycle compounds (e.g. pyridine); hydrocarbons (e.g. benzene, hexane); alkyl halides (e.g. chloroform, dichloromethane, tetrachloroethane); esters (e.g. methyl acetate, butyl acetate); ketones (e.g. acetone, methyl ethyl ketone); and ethers (e.g. tetrahydrofuran, 1,2-dimethoxyethane). Alkyl halides and ketones are preferably used. Two or more kinds of organic solvent can be used in combination.

Such a coating fluid can be applied by a known method (e.g. wire bar coating, extrusion coating, direct gravure coating, reverse gravure coating or die coating method).

The thickness of the optically anisotropic layer is preferably 0.1 to 20 μm, more preferably 0.5 to 15 μm, and most preferably 1 to 10 μm.

[Fixation of Orientation State of Liquid Crystalline Molecules]

The oriented state of the oriented liquid crystalline molecules can be maintained and fixed. Preferably, the fixation is performed by polymerization. Types of polymerization include: heat polymerization using a heat polymerization initiator and photopolymerization using a photopolymerization initiator. For the fixation, photopolymerization is preferably used.

Examples of photopolymerization initiators include: α-carbonyl compounds (described in U.S. Pat. Nos. 2,367,661 and 2,367,670); acyloin ethers (described in U.S. Pat. No. 2,448,828); α-hydrocarbon-substituted aromatic acyloin compounds (U.S. Pat. No. 2,722,512); multi-nucleus quinone compounds (described in U.S. Pat. Nos. 3,046,127 and 2,951,758); combinations of triarylimidazole dimmer and p-aminophenyl ketone (described in U.S. Pat. No. 3,549,367); acridine and phenazine compounds (described in Japanese Patent Application Laid-Open No. 60-105667 and U.S. Pat. No. 4,239,850); and oxadiazole compounds (described in U.S. Pat. No. 4,212,970).

The amount of the photopolymerization initiators used is preferably in the range of 0.01 to 20% by mass of the solid content of the coating fluid and more preferably in the range of 0.5 to 5% by mass.

Light irradiation for the polymerization of liquid crystalline molecules is preferably performed using ultraviolet light. Irradiation energy is preferably in the range of 20 mJ/cm$^2$ to 50 J/cm$^2$, more preferably 20 to 5000 mJ/cm$^2$, and much more preferably 100 to 800 mJ/cm$^2$. To accelerate the photopolymerization, light irradiation may be performed under heat.

A protective layer may be provided on the surface of the optically anisotropic layer.

Combining the optical compensation film with a polarizing layer is also preferable. Specifically, an optically anisotropic layer is formed on a polarizing film by coating the surface of the polarizing film with the above described coating fluid for an optically anisotropic layer. As a result, thin polarlizer, in which stress generated with the dimensional change of polarizing film (distorsion×cross-sectional area×modulus of elasticity) is small, can be prepared without using a polymer film between the polarizing film and the optically anisotropic layer. Installing the polarizer according to the present invention in a large-sized liquid crystal display device enables high-quality images to be displayed without causing problems such as light leakage.

Preferably, stretching is performed while keeping the tilt angle of the polarizing layer and the optical compensation layer to the angle between the transmission axis of the two sheets of polarizer laminated on both sides of a liquid crystal cell constituting LCD and the longitudinal or transverse direction of the liquid crystal cell. Generally the tilt angle is 45°. However, in recent years, transmissive-, reflective-, and semi-transmissive-liquid crystal display devices have been developed in which the tilt angle is not always 45°, and thus, it is preferable to adjust the stretching direction arbitrarily to the design of each LCD.

[Liquid Crystal Display Devices]

Liquid crystal modes in which the above described optical compensation film is used will be described.

(TN-Mode Liquid Crystal Display Devices)

TN-mode liquid crystal display devices are most commonly used as a color TFT liquid crystal display device and described in a large number of documents. The oriented state in a TN-mode liquid crystal cell in the black state is such that the rod-shaped liquid crystalline molecules stand in the middle of the cell while the rod-shaped liquid crystalline molecules lie near the substrates of the cell.

(OCB-Mode Liquid Crystal Display Devices)

An OCB-mode liquid crystal cell is a bend orientation mode liquid crystal cell where the rod-shaped liquid crystalline molecules in the upper part of the liquid cell and those in the lower part of the liquid cell are oriented in substantially opposite directions (symmetrically). Liquid crystal displays using a bend orientation mode liquid crystal cell are disclosed in U.S. Pat. Nos. 4,583,825 and 5,410,422. A bend orientation mode liquid crystal cell has a self-compensation function since the rod-shaped liquid crystalline molecules in the upper part of the liquid cell and those in the lower part are symmetrically oriented. Thus, this liquid crystal mode is also referred to as OCB (Optically Compensatory Bend) liquid crystal mode.

Like in the TN-mode cell, the oriented state in an OCB-mode liquid crystal cell in the black state is also such that the rod-shaped liquid crystalline molecules stand in the middle of the cell while the rod-shaped liquid crystalline molecules lie near the substrates of the cell.

(VA-Mode Liquid Crystal Display Devices)

VA-mode liquid crystal cells are characterized in that in the cells, rod-shaped liquid crystalline molecules are oriented substantially vertically when no voltage is applied. The VA-mode liquid crystal cells include: (1) a VA-mode liquid crystal cell in a narrow sense where rod-shaped liquid crystalline molecules are oriented substantially vertically when no voltage is applied, while they are oriented substantially horizontally when a voltage is applied (Japanese Patent Application Laid-Open No. 2-176625); (2) a MVA-mode liquid crystal cell obtained by introducing multi-domain switching of liquid crystal into a VA-mode liquid crystal cell to obtain wider viewing angle, (SID 97, Digest of Tech. Papers (Proceedings) 28 (1997) 845), (3) a n-ASM-mode liquid crystal cell where rod-shaped liquid crystalline molecules undergo substantially vertical orientation when no voltage is applied, while they undergo twisted multi-domain orientation when a voltage is applied (Proceedings 58 to 59 (1998), Symposium, Japanese Liquid Crystal Society); and (4) a SURVAIVAL-mode liquid crystal cell (reported in LCD: international 98).

(IPS-Mode Liquid Crystal Display Devices)

IPS-mode liquid crystal cells are characterized in that in the cells, rod-shaped liquid crystalline molecules are oriented substantially horizontally in plane when no voltage is applied and switching is performed by changing the orientation direction of the crystal in accordance with the presence or absence of application of voltage. Specific examples of IPS-mode liquid crystal cells applicable include those described in Japanese Patent Application Laid-Open Nos. 2004-365941, 2004-12731, 2004-215620, 2002-221726, 2002-55341 and 2003-195333.

(Other Modes of Liquid Crystal Display Devices)

In ECB-mode, STN (Supper Twisted Nematic)-mode, FLC (Ferroelectric Liquid Crystal)-mode, AFLC (Anti-ferroelectric Liquid Crystal)-mode, and ASM (Axially Symmetric Aligned Microcell)-mode cells, optical compensation can also be achieved with the above described logic. These cells are effective in any of the transmissive-, reflective-, and semi-transmissive-liquid crystal display devices. These are also advantageously used as an optical compensation sheet for GH (Guest-Host)-mode reflective liquid crystal display devices.

Examples of practical applications in which the cellulose derivative films described so far are used are described in Journal of Technical Disclosure (Laid-Open No. 2001-1745, Mar. 15, 2001, issued by Japan Institute of Invention and Innovation), 45-59. Providing antireflection layer (antireflection film)

Generally an antireflection film is made up of: a low-refractive-index layer which also functions as a stainproof layer; and at least one layer having a refractive index higher than that of the low-refractive-index layer (i.e. high-refractive-index layer and/or intermediate-refractive-index layer) provided on a transparent substrate.

Methods of forming a multi-layer thin film as a laminate of transparent thin films of inorganic compounds (e.g. metal oxides) having different refractive indices include: chemical vapor deposition (CVD); physical vapor deposition (PVD); and a method in which a film of a colloid of metal oxide particles is formed by sol-gel process from a metal compound such as a metal alkoxide and the formed film is subjected to post-treatment (ultraviolet light irradiation: Japanese Patent Application Laid-Open No. 9-157855, plasma treatment: Japanese Patent Application Laid-Open No. 2002-327310).

On the other hand, there are proposed a various antireflection films, as highly productive antireflection films, which are formed by coating thin films of a matrix and inorganic particles dispersing therein in a laminated manner.

There is also provided an antireflection film including an antireflection layer provided with anti-glare properties, which is formed by using an antireflection film formed by coating as described above and providing the outermost surface of the film with fine irregularities.

The cellulose acylate film of the present invention is applicable to antireflection films formed by any of the above described methods, but particularly preferable is the antireflection film formed by coating (coating type antireflection film).

[Layer Configuration of Coating-Type Antireflection Film]

An antireflection film having at least on its substrate a layer construction of: intermediate-refractive-index layer, high-refractive-index layer and low-refractive-index layer (outermost layer) in this order is designed to have a refractive index satisfying the following relationship.

Refractive index of high-refractive-index layer>refractive index of intermediate-refractive-index layer>refractive index of transparent substrate>refractive index of low-refractive-index layer, and a hard coat layer may be provided between the transparent substrate and the intermediate-refractive-index layer.

The antireflection film may also be made up of: intermediate-refractive-index hard coat layer, high-refractive-index layer and low-refractive-index layer.

Examples of such antireflection films include: those described in Japanese Patent Application Laid-Open Nos. 8-122504, 8-110401, 10-300902, 2002-243906 and 2000-111706. Other functions may also be imparted to each layer. There are proposed, for example, antireflection films that include a stainproofing low-refractive-index layer or antistatic high-refractive-index layer (e.g. Japanese Patent Application Laid-Open Nos. 10-206603 and 2002-243906).

The haze of the antireflection film is preferably 5% or less and more preferably 3% or less. The strength of the film is preferably H or higher, by pencil hardness test in accordance with JIS K5400, more preferably 2H or higher, and most preferably 3H or higher.

[High-Refractive-Index Layer and Intermediate-Refractive-Index Layer]

The layer of the antireflection film having a high refractive index consists of a curable film that contains: at least ultra-fine particles of high-refractive-index inorganic compound having an average particle size of 100 nm or less; and a matrix binder.

Fine particles of high-refractive-index inorganic compound include: for example, those of inorganic compounds having a refractive index of 1.65 or more and preferably 1.9 or more. Specific examples of such inorganic compounds include: oxides of Ti, Zn, Sb, Sn, Zr, Ce, Ta, La or In; and composite oxides containing these metal atoms.

Methods of forming such ultra-fine particles include: for example, treating the particle surface with a surface treatment agent (e.g. a silane coupling agent, Japanese Patent Application Laid-Open Nos. 11-295503, 11-153703, 2000-9908, an anionic compound or organic metal coupling agent, Japanese Patent Application Laid-Open No. 2001-310432 etc.); allowing particles to have a core-shell structure in which a core is made up of high-refractive-index particle(s) (Japanese Patent Application Laid-Open No. 2001-166104 etc.); and using a specific dispersant together (Japanese Patent Application Laid-Open No. 11-153703, U.S. Pat. No. 6,210,858B1, Japanese Patent Application Laid-Open No. 2002-2776069, etc.).

Materials used for forming a matrix include: for example, conventionally known thermoplastic resins and curable resin films.

Further, as such a material, at least one composition is preferable which is selected from the group consisting of: a composition including a polyfunctional compound that has at least two radically polymerizable and/or cationically polymerizable group; an organic metal compound containing a hydrolytic group; and a composition as a partially condensed product of the above organic metal compound. Examples of such materials include: compounds described in Japanese Patent Application Laid-Open Nos. 2000-47004, 2001-315242, 2001-31871 and 2001-296401.

A curable film prepared using a colloidal metal oxide obtained from the hydrolyzed condensate of metal alkoxide and a metal alkoxide composition is also preferred. Examples are described in Japanese Patent Application Laid-Open No. 2001-293818.

The refractive index of the high-refractive-index layer is generally 1.70 to 2.20. The thickness of the high-refractive-index layer is preferably 5 nm to 10 μm and more preferably 10 nm to 1 μm.

The refractive index of the intermediate-refractive-index layer is adjusted to a value between the refractive index of the low-refractive-index layer and that of the high-refractive-index layer. The refractive index of the intermediate-refractive-index layer is preferably 1.50 to 1.70.

[Low-Refractive-Index Layer]

The low-refractive-index layer is formed on the high-refractive-index layer sequentially in the laminated manner. The refractive index of the low-refractive-index layer is 1.20 to 1.55 and preferably 1.30 to 1.50.

Preferably, the low-refractive-index layer is formed as the outermost layer having scratch resistance and stainproofing properties. As means of significantly improving scratch resistance, it is effective to provide the surface of the layer with slip properties, and conventionally known thin film forming means that includes introducing silicone or fluorine is used.

The refractive index of the fluorine-containing compound is preferably 1.35 to 1.50 and more preferably 1.36 to 1.47. The fluorine-containing compound is preferably a compound that includes a crosslinkable or polymerizable functional group containing fluorine atom in an amount of 35 to 80% by mass.

Examples of such compounds include: compounds described in Japanese Patent Application Laid-Open No. 9-222503, columns [0018] to [0026], Japanese Patent Application Laid-Open No. 11-38202, columns [0019] to [0030], Japanese Patent Application Laid-Open No. 2001-40284, columns [0027] to [0028], Japanese Patent Application Laid-Open No. 2000-284102, etc.

A silicone compound is preferably such that it has a polysiloxane structure, it includes a curable or polymerizable functional group in its polymer chain, and it has a crosslinking structure in the film. Examples of such silicone compounds include: reactive silicone (e.g. SILAPLANE manufactured by Chisso Corporation); and polysiloxane having a silanol group on each of its ends (one described in Japanese Patent Application Laid-Open No. 11-258403).

The crosslinking or polymerization reaction for preparing such fluorine-containing polymer and/or siloxane polymer containing a crosslinkable or polymerizable group is preferably carried out by radiation of light or by heating simultaneously with or after applying a coating composition for forming an outermost layer, which contains a polymerization initiator, a sensitizing agent, etc.

A sol-gel cured film is also preferable which is obtained by curing the above coating composition by the condensation reaction carried out between an organic metal compound, such as silane coupling agent, and silane coupling agent containing a specific fluorine-containing hydrocarbon group in the presence of a catalyst.

Examples of such films include: those of polyfluoroalkyl-group-containing silane compounds or the partially hydrolyzed and condensed compounds thereof (compounds described in Japanese Patent Application Laid-Open Nos. 58-142958, 58-147483, 58-147484, 9-157582 and 11-106704); and silyl compounds that contain "perfluoroalkyl ether" group as a fluoline-containing long-chain group (compounds described in Japanese Patent Application Laid-Open Nos. 2000-117902, 2001-48590 and 2002-53804).

The low-refractive-index layer can contain additives other than the above described ones, such as filler (e.g. low-refractive-index inorganic compounds whose primary particles have an average particle size of 1 to 150 nm, such as silicon dioxide (silica) and fluorine-containing particles (magnesium fluoride, calcium fluoride, barium fluoride); organic fine particles described in Japanese Patent Application Laid-Open No. 11-3820, columns [0020] to [0038]), silane coupling agent, slippering agent and surfactant.

When located under the outermost layer, the low-refractive-index layer may be formed by vapor phase method (vacuum evaporation, spattering, ion plating, plasma CVD, etc.). From the viewpoint of reducing producing costs, coating method is preferable.

The thickness of the low-refractive-index layer is preferably 30 to 200 nm, more preferably 50 to 150 nm, and most preferably 60 to 120 nm.

[Hard Coat Layer]

A hard coat layer is provided on the surface of both stretched and unstretched cellulose acylate films so as to impart physical strength to the antireflection film. Particularly preferably the hard coat layer is provided between the stretched cellulose acylate film and the above described high-refractive-index-layer and between the unstretched cellulose acylate film and the above described high-refractive-index layer. It is also preferable to provide the hard coat layer directly on the stretched and unstretched cellulose acylate films by coating without providing an antireflection layer.

Preferably, the hard coat layer is formed by the crosslinking reaction or polymerization of compounds curable by light and/or heat. Preferred curable functional groups are photopolymerizable functional groups, and organic metal compounds having a hydrolytic functional group are preferably organic alkoxy silyl compounds.

Specific examples of such compounds include the same compounds as illustrated in the description of the high-refractive-index layer.

Specific examples of compositions that constitute the hard coat layer include: those described in Japanese Patent Application Laid-Open Nos. 2002-144913, 2000-9908 and WO 0/46617.

The high-refractive-index layer can also serve as a hard coat layer. In this case, it is preferable to form the hard coat layer using the technique described in the description of the high-refractive-index layer so that fine particles are contained in the hard coat layer in the dispersed state.

The hard coat layer can also serves as an anti-glare layer (described later), if particles having an average particle size of 0.2 to 10 μm are added to provide the layer with the anti-glare function.

The thickness of the hard coat layer can be properly designed depending on the applications for which it is used. The thickness of the hard coat layer is preferably 0.2 to 10 μm and more preferably 0.5 to 7 μm.

The strength of the hard coat layer is preferably H or higher, by pencil hardness test in accordance with JIS K5400, more preferably 2H or higher, and much more preferably 3H or higher. The hard coat layer having a smaller abrasion loss in test, before and after Taber abrasion test conducted in accordance with JIS K5400, is more preferable.

[Forward Scattering Layer]

A forward scattering layer is provided so that it provides, when applied to liquid crystal displays, the effect of improving viewing angle when the angle of vision is tilted up-, down-, right- or leftward. The above described hard coat layer can also serve as a forward scattering layer, if fine particles with different refractive index are dispersed in it.

Example of such layers include: those described in Japanese Patent Application Laid-Open No. 11-38208 where the coefficient of forward scattering is specified; those described in Japanese Patent Application Laid-Open No. 2000-199809 where the relative refractive index of transparent resin and fine particles are allowed to fall in the specified range; and those described in Japanese Patent Application Laid-Open No. 2002-107512 wherein the haze value is specified to 40% or higher.

[Other Layers]

Besides the above described layers, a primer layer, antistatic layer, undercoat layer or protective layer may be provided.

[Coating Method]

The layers of the antireflection film can be formed by any method of dip coating, air knife coating, curtain coating, roller coating, wire bar coating, gravure coating, microgravure coating and extrusion coating (U.S. Pat. No. 2,681,294).

[Anti-Glare Function]

The antireflection film may have the anti-glare function that scatters external light. The anti-glare function can be obtained by forming irregularities on the surface of the antireflection film. When the antireflection film has the anti-glare function, the haze of the antireflection film is preferably 3 to 30%, more preferably 5 to 20%, and most preferably 7 to 20%.

As a method for forming irregularities on the surface of antireflection film, any method can be employed, as long as it can maintain the surface geometry of the film. Such methods include: for example, a method in which fine particles are used in the low-refractive-index layer to form irregularities on the surface of the film (e.g. Japanese Patent Application Laid-Open No. 2000-271878); a method in which a small amount (0.1 to 50% by mass) of particles having a relatively large size (0.05 to 2 μm in particle size) are added to the layer under a low-refractive-index layer (high-refractive-index layer, intermediate-refractive-index layer or hard coat layer) to form a film having irregularities on the surface and a low-refractive-index layer is formed on the irregular surface while keeping the geometry (e.g. Japanese Patent Application Laid-Open Nos. 2000-281410, 2000-95893, 2001-100004, 2001-281407); a method in which irregularities are physically transferred on the surface of the outermost layer (stainproofing layer) having been provided (e.g. embossing described in Japanese Patent Application Laid-Open Nos. 63-278839, 11-183710, 2000-275401).

[Applications]

The unstretched and stretched cellulose acylate films of the present invention are useful as optical films, particularly as polarizer protective film, optical compensation sheet (also referred to as retardation film) for liquid crystal displays, optical compensation sheet for reflection-type liquid crystal displays, and substrate for silver halide photographic photosensitive materials.

In the following the measurement methods used in the present invention will be described.

(1) Modulus of Elasticity

Modulus of elasticity was obtained by measuring the stress in the 0.5% stretching at a stress rate of 10%/min in an atmosphere of 23° C., 70% rh. Measurement was made in the MD and TD directions and the average of the measurements was used as modulus of elasticity.

(2) Substitution Degree of Cellulose Acylate

The substitution degree of the acyl groups of cellulose acylate and that of the acyl groups at 6-position were obtained by the method described in Carbohydr. Res. 273 (1995) 83-91 (Tedzuka et al.), using 13C-NMR.

(3) Residual Solvent

Samples were prepared in which 300 mg of sample film is dissolved in 30 ml of methyl acetate (sample A) and in which 300 mg of sample film was dissolved in 30 ml of dichloromethane (sample B).

Measurement was made for these samples by gas chromatography (GC) under the following conditions.
Column: DB-WAX (0.25 mmϕ×30 m, film thickness 0.25 μm)
Column temperature: 50° C.
Carrier gas: nitrogen
Analysis time: 15 minutes
Amount of sample injected: 1 μml The amount of the solvent used was determined the following process.

For sample A, from the peaks other than that of the solvent (methyl acetate), the contents were obtained using a calibration curve, and the sum of the contents was expressed by Sa.

For sample B, from the peaks which were hidden in sample A due to the peaks of the solvent, the contents were obtained using a calibration curve, and the sum of the contents was expressed by Sb.

The sum of Sa and Sb was used as the amount of residual solvent.

(4) Loss in Weight on Heat at 220° C.

The sample was heated from room temperature to 400° C. at a heating rate of 10° C./min in an atmosphere of nitrogen using TG-DTA 2000S manufactured by MAC Science, and the weight change of 10 mg of the sample at 220° C. was used as the loss in weight on heat at 220° C.

(5) Melt Viscosity

Melt viscosity was measured using viscoelasticity measuring equipment with a corn plate (e.g. modular compact rheometer: Physica MCR301 manufactured by Anton Paar) under the following conditions.

The resin was fully dried so that its water content is 0.1% or less, and the melt viscosity was measured at a gap of 500 μm, temperature of 220° C. and shear rate of 1 (/sec).

(6) Re and Rth

Samples were collected at 10 points at fixed intervals across the width of the film. The samples underwent moisture conditioning at 25° C., 60% rh for 4 hours. Then, the retardations at wavelength of 590 nm were measured by an automatic double refraction meter (KOBRA-21ADH/PR: manufactured by Ouji Science Instrument) at 25° C., 60% rh while allowing light to enter the film from the direction inclined at angles of +500 to −50° in increments of 10° C. to the direction normal to the film using the slow axis in plane as a rotational axisin-plane. And the retardation (Re) and across-the-thickness retardation (Rth) were calculated using the measurements.

In the following the features of the present invention will be described in further detail by examples and comparative examples. It is to be understood that various changes in the materials used, the amount, proportion and treatment of the same, the treatment procedure for the same, etc. may be made without departing from the spirit of the present invention. Accordingly, it is also to be understood that the scope of the present invention is not limited to the following examples.

Examples

1. Formation of Cellulose Acylate Film (1) Preparation of Cellulose Acylate

The cellulose acylates of Examples 1 to 13 and Comparative Examples 1 to 2 shown in Table 1 of FIG. 5 were obtained by adding to cellulose sulfuric acid (7.8 parts by weight to 100 parts of cellulose) as a catalyst, and a carboxylic acid, as a raw material for an acyl substituent, to allowing them to acylation reaction at 40° C. In this acylation, the kind and degree of an acyl substituent were adjusted by adjusting the kind and amount of the carboxylic acid used. Further, after the acylation, aging was performed at 40° C. to prepare samples with different degrees of polymerization (the longer the aging time, the lower the degree of polymerization). The degree of polymerization of each of the cellulose acylates thus produced was obtained the following method.

(Method of Determining Degree of Polymerization)

About 0.2 g of absolutely dried cellulose acylate was weighed and dissolved in 100 ml of mixed solvent of methylene chloride:ethanol=9:1 (by mass). The dropping time of this solution (in second) was measured at 25° C. in an Ostwald viscometer and the polymerization degree of the cellulose acylate was obtained by the following equations.

ηrel=T/T0 T: dropping time of sample to be measured (in second)

[η]=(lnηrel)/C T0: dropping time of solvent alone (in second)

DP=[η]/Km C: concentration (g/l)

Km:6×10⁻⁴

(2) Pelletization of Cellulose Acylate

The above described cellulose acylate, plasticizer, stabilizer and optical adjustor selected from below were dried at 100° C. for 3 hours so that their water contents were 0.1% by weight or less. And 0.05% by weight of silicon dioxide particles (Aerosil R972V) and ultraviolet absorber (2-(2'-hydroxy-3',5-di-t-butylphenyl)-benzotriazol: 0.05% by weight, 2,4-hydroxy-4-methoxy-benzophenone: 0.1%) were added to cellulose acylates with each and every levels of polymerization degrees.

(i) Plasticizer
  Plasticizer A: polyethylene glycol (molecular weight 600)
  Plasticizer B: glycerin diacetate oleate
  Plasticizer C: glycerin tetracaprylate
  Plasticizer D: glycerin diacetate laurate
  Plasticizer E: compound of Example B in National Publication of International Patent Application No. 6-501040
  Plasticizer F: ethyl phthalyl ethyl glycolate (ii) Stabilizer
a. Phosphite-Based Stabilizer
  Stabilizer A: bis(2,6-di-t-butyl-4-methylphenyl)pentaerythrithol diphosphite
  Stabilider B: bis(2,4-di-t-butylphenyl)pentaerythrithol diphosphite
b. Phosphite Ester Compound
  Stabilizer C: tris(2,4-di-t-butylphenyl)phosphite
  Stabilizer D: 2,2-methylene bis(4,6-di-t-butylphenyl)octylphosphite
c. Others
  Stabilizer E: citric acid
a. Phosphite-Based Stabilizer
  Stabilizer A: bis(2,6-di-t-butyl-4-methylphenyl)pentaerythrithol diphosphite
  Stabilider B: bis(2,4-di-t-butylphenyl)pentaerythrithol diphosphite
b. Phosphite Ester Compound
  Stabilizer C: tris(2,4-di-t-butylphenyl)phosphite
  Stabilizer D: 2,2-methylene bis(4,6-di-t-butylphenyl)octylphosphite
c. Others
  Stabilizer E: citric acid (iii) Optical Adjustor These dried pellets were put into a hopper, while the temperatures of the melt extruder and die were adjusted. The screw used has a diameter (on the outlet side) of 60 mm, an L/D of 50 and a compression ratio of 4. The screw on the inlet side was cooled by circulating, inside the screw, oil at a temperature of Tg of the pellets −5° C. The residence time of the resin in the barrel was 5 minutes. The temperature of the barrel was so adjusted that the maximum temperature was achieved at its outlet and the minimum at its inlet. The resin extruded from the extruder was weighed and delivered a fixed amount at a time by a gear pump, while changing the number of the extruder revolution so that the pressure of the resin before the gear pump could be controlled to be at a constant pressure of 10 MPa. The molten resin delivered from the gear pump was filtered through a leaf disc filter with a filtration rating of 5 μmm, extruded from a hanger coat die with slits spaced at intervals of 0.8 mm via a static mixer, and solidified in a casting drum. At this operation, static electricity was applied to each solidified resin for its portions of 10 cm from both ends by electrostatic application method for each level (a wire of 10 kV was positioned 10 cm apart from the point of the casting drum where the resin was landed). The solidified melt was stripped off from the casting drum, both ends (5% of the total width for each) of the strip underwent trimming right before wound up and then knurling 10 mm wide and 50 μm high, and then the strip was wound up 3000 m at a wind-up ration of 30 m/min. Each of the unstretched films thus obtained had a width of 1.5 m and a thickness described in FIG. 4.

(4) Evaluation of Film (Unstretched) Formed by Melt Forming Process

The cellulose acylate films thus obtained were evaluated by the above described methods. The Tg of each film was determined by the following method and is shown in FIG. 4.

(Tg Measurement)

20 mg of a sample was introduced into a DSC measurement pan. The sample was heated from 30° C. to 250° C. at 10° C./min in a nitrogen stream (1st-run), and then cooled to 30° C. at −10° C./min. Then, the sample was heated again from 30° C. to 250° C. (2nd-run). Tg determined in the 2nd-run (temperature that allows the base line to distort from the low temperature side) is described in Table 4.

(Measurement of Thickness Fluctuation)

The thickness fluctuation was determined at a speed of 600 mm/min using an electronic micrometer manufactured by Anritsu Corp., recorded on a chart sheet on a 1/20 scale at a chart speed of 30 mm/min, measured with a ruler, and round to the nearest whole number.

Cheemical Formula (11)

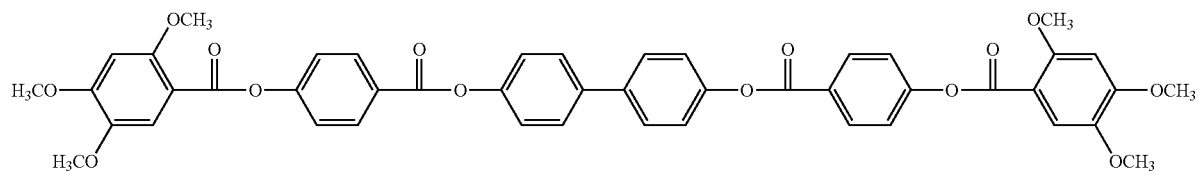

(3) Melt Film Formation

The cellulose acylate pellets prepared by the above described method were dried at 100° C. for 5 hours with dehumidified air having a dew-point temperature of −40° C. so that their moisture content is 0.01% by weight or less.

(Yellowness Index (YI Value))

Yellowness (YI: yellowness index) was measured using a Z-ii optical sensor in accordance with JIS J7105 6.3.

Tristimulus values X, Y, and Z of the pellets were measured by a reflection method, and those of the film were measured by a transmission method. The YI values were calculated by the following formula using the tristimulus values X, Y, and Z.

$$YI = \{(1.28X - 1.06Z)/Y\} \times 100$$

Further, the YI value of the film calculated by the above formula was divided by the thickness of the film to convert it into a value for 1 mm thickness, which was then used for comparison.

Cellulose acylate films of Examples 1 to 5 and Comparative Examples 1 and 2 shown in Table 1 of FIG. 4 were produced from a cellulose acylate resin having the same substitution degree. In Examples 1 to 5, a melt-extrusion step was carried out in a tandem extruder having a first-stage extruder and a second-stage extruder connected in tandem. In Comparative Examples 1 and 2, a melt-extrusion step is carried out in one extruder.

It is found that in Comparative Examples 1 and 2, since the melt-extrusion step is carried out in one extruder, the discharge pressure considerably fluctuates even if the extruder is a single-screw extruder or a twin-screw extruder, and thus the film thickness also considerably fluctuates. On the other hand, it is found that in Examples 1 to 5, since the melt-extrusion step is carried out in a tandem extruder, the discharge pressure only slightly fluctuates, and thus the film thickness also only slightly fluctuates.

The above-described Examples 1 to 5 will be described in more detail. In Example 1, a twin-screw extruder is used as a first-stage extruder, a single-screw extruder is used as a second-stage extruder, a reservoir tank is provided, and the reservoir tank is filled with nitrogen as an inert gas. Thus, the discharge pressure only slightly fluctuates, the film thickness slightly fluctuates, and yellowness (discoloration) is also low. In Example 3, although a twin-screw extruder is used as a first-stage extruder and a single-screw extruder is used as a second-stage extruder, a reservoir tank is not provided. Thus, the discharge pressure considerably fluctuates and the film thickness considerably fluctuates as compared with Example. 1. In Example 5, a twin-screw extruder is used as a first-stage extruder, a single-screw extruder is used as a second-stage extruder, a reservoir tank is provided, but the atmosphere in the reservoir tank is not replaced with nitrogen. Thus, the discharge pressure only slightly fluctuates and the film thickness slightly fluctuates as in Example 1, but yellowness (discoloration) is more significant than that in Example 1.

(5) Preparation of Polarizing Plate

Unstretched films having different film materials (which differ in the substitution degrees, the polymerization degree, and the type and amount of plasticizer) as described in Table 2 of FIG. 5 were produced under the film-forming conditions of Example 1 (presumably the best mode) in Table 1 of FIG. 4, and the following polarizing plate was prepared.

(5-1) Saponification of Cellulose Acylate Film

Each unstretched cellulose acylate film was saponified by the immersion-saponification process described below. Almost the same results were obtained for the unstretched cellulose acylate films saponified by the following coating-saponification process.

(i) Coating-Saponification Process

To 80 parts by mass of isopropanol, 20 parts by mass of water was added, and KOH was dissolved in the above mixture so that the normality of the solution was 2.5. The temperature of the solution was adjusted to 60° C. and used as a saponifying solution.

The saponifying solution was applied to the cellulose acylate film at 60° C. in an amount of 10 g/m² to allow the cellulose acylate film to undergo saponification for 1 minute.

Then, the saponified cellulose acylate film underwent spray washing with warm water spray at 50° C. at a spraying rate of 10 L/m²·min for 1 minute.

(ii) Immersion-Saponification Process

As a saponifying solution, 2.5 N NaOH aqueous solution was used.

The temperature of this solution was adjusted to 60° C., and each cellulose acylate film was immersed in the solution for 2 minutes.

Then, the film was immersed in 0.1 N aqueous solution of sulfuric acid for 30 seconds and passed through a water washing bath.

(5-2) Preparation of Polarizing Layer

A polarizing layer 20 μm thick was prepared by creating a difference in peripheral velocity between two pairs of nip rolls to carry out stretching in the longitudinal direction in accordance with Example 1 described in Japanese Patent Application Laid-Open No. 2001-141926.

(5-3) Lamination

The polarizing layer thus obtained, the above described saponified unstretched and stretched cellulose acylate films, and saponified Fujitack (unstretched triacetate film) were laminated with a 3% PVA aqueous solution (PVA-117H, manufactured by Kuraray Co., Ltd.) as an adhesive, in the direction of the polarizing film stretching and the cellulose acylate film forming flow (longitudinal direction) in the following combinations.

Polarizer A: unstretched cellulose acylate film/polarizing layer/Fujitack
Polarizer B: unstretched cellulose acylate film/polarizing layer/unstretched cellulose acylate film

(54) Color Tone Change of Polarizer

The magnitude of the color tone change of the sheets of polarizer thus obtained was graded according to 10 ranks (the larger number indicates the larger color tone change). The sheets of polarizer prepared by embodying the present invention both gained high grades.

(5-5) Evaluation of Humidity Curl

The sheets of polarizer thus obtained were evaluated by the above described method. The cellulose acylate film formed by embodying the present invention showed good characteristics (low humidity curl).

Sheets of polarizer were also prepared in which lamination was performed so that the polarization axis and the longitudinal direction of the cellulose acylate film were crossed at right angles and at an angle of 45°. The same evaluation was made for them. The results were the same as the sheets of polarizer in which the polarizing film and the cellulose acylate film were laminated in parallel with each other.

(6) Preparation of Optical Compensation Film and Liquid Crystal Display Device

The polarizer provided on the observers' side in a 22-inch LCD device (manufactured by Sharp Corporation) in which VA-mode LC cell was used was stripped off. Instead of the polarizer, the above described retardation polarizer A or B was laminated on the observers' side in the above LCD device via an adhesive so that the cellulose acylate film is on the side of the LC cell. A liquid crystal display device was prepared by arranging the polarizer so that the transmission axis of the polarizer on the observers' side and that of the polarizer on the backlight side were crossed at right angles.

In this case, too, the cellulose acylate film of the present invention exhibit a low humidity curl, and therefore, it was easy to laminate, whereby it was less likely to be out of position when laminated.

Further, when using the cellulose acylate film of the present invention, instead of the cellulose acetate film of Example 1 described in Japanese Patent Application Laid-Open No. 11-316378 whose surface was coated with a liquid crystal layer, a good optical compensation film exhibiting a low humidity curl could be obtained.

When using the cellulose acylate film of the present invention, instead of the cellulose acetate film of Example 1 described in Japanese Patent Application Laid-Open No. 7-333433 whose surface was coated with a liquid crystal layer, a good optical compensation film exhibiting a low humidity curl could be obtained.

Further, when using the polarizer and retardation polarizer of the present invention in the liquid crystal display described in Example 1 of Japanese Patent Application Laid-Open No. 10-48420, for the optically anisotropic layer containing discotic liquid crystal molecules, for the orientation film whose surface was coated with polyvinyl alcohol, in the 20-inch VA-mode liquid crystal display described in FIGS. 2 to 9 of Japanese Patent Application Laid-Open No. 2000-154261, in the 20-inch OCB-mode liquid crystal display described in FIGS. 10 to 15 of Japanese Patent Application Laid-Open No. 2000-154261, and in the IPS-mode liquid crystal display described in FIG. 11 of Japanese Patent Application Laid-Open No. 2004-12731, good liquid crystal displays devices exhibiting a low humidity curl were obtained.

(7) Preparation of Low Reflection Film

A low reflection film was prepared in accordance with Example 47 described in Journal of Technical Disclosure (Laid-Open No. 2001-1745) issued by Japan Institute of Invention and Innovation. The humidity curl of the prepared film was measured by the above described method. The cellulose acylate film formed by embodying the present invention produced good results when formed into a low reflection film, just like the case where it is formed into sheets of polarizer.

The low reflection film of the present invention was laminated on the outermost surface of the liquid crystal display described in Example 1 of Japanese Patent Application Laid-Open No. 10-48420, the 20-inch VA-mode liquid crystal display described in FIGS. 2 to 9 of Japanese Patent Application Laid-Open No. 2000-154261, the 20-inch OCB-mode liquid crystal display described in FIGS. 10 to 15 of Japanese Patent Application Laid-Open No. 2000-154261, and the IPS-mode liquid crystal display described in FIG. 11 of Japanese Patent Application Laid-Open No. 2004-12731 and the resultant liquid crystal displays were evaluated. The liquid crystal displays obtained were all good.

What is claimed is:

1. A method for producing a cellulose acylate resin film, comprising the step of, melting a cellulose acylate resin in an extruder and extruding the molten cellulose acylate resin to a die, wherein the step of melting is carried out using a tandem extruder having a first-stage extruder and a second-stage extruder connected in tandem, the cellulose acylate resin has an acylate group satisfying the following substitution degree:

$$2.0 \leq X+Y \leq 3.0 \quad (1)$$

$$0 \leq X \leq 2.0 \quad (2)$$

$$1.2 \leq Y \leq 2.9 \quad (3)$$

wherein X is a substitution degree of an acetyl group, and Y is a total substitution degree of a propionyl group, butyryl group, pentanoyl group, and hexanoyl group, wherein a reservoir tank having a heating device is provided between the first-stage extruder and the second-stage extruder to absorb the fluctuation in pressure between the first-stage extruder and the second-stage extruder, and wherein the reservoir tank has a head space part filled with an inert gas.

2. The method for producing a cellulose acylate resin film according to claim 1, wherein the cellulose acylate resin before melting is in the form of a powder or flakes.

3. The method for producing a cellulose acylate resin film according to claim 2, wherein a twin-screw extruder is used as the first-stage extruder, and a single-screw extruder is used as the second-stage extruder.

4. The method for producing a cellulose acylate resin film according to claim 3, wherein the first-stage extruder is a vent extruder.

5. The method for producing a cellulose acylate resin film according to claim 1, wherein an additive is added to the first-stage extruder.

6. The method for producing a cellulose acylate resin film according to claim 1, wherein the amount and/or the pressure of the molten cellulose acylate resin in the reservoir tank are controlled to be constant.

* * * * *